(12) United States Patent
Young et al.

(10) Patent No.: US 7,258,104 B2
(45) Date of Patent: Aug. 21, 2007

(54) METHOD AND APPARATUS FOR CONTROLLING OPERATION OF DUAL MODE HCCI ENGINES

(75) Inventors: Jialin Young, Canton, MI (US); Brad Boyer, Canton, MI (US); Kim Ku, West Bloomfield, MI (US); Fang Shui, Farmington Hills, MI (US); William Stockhausen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/372,715

(22) Filed: Mar. 10, 2006

(65) Prior Publication Data

US 2006/0150952 A1    Jul. 13, 2006

Related U.S. Application Data

(62) Division of application No. 10/708,345, filed on Feb. 25, 2004, now abandoned.

(51) Int. Cl.
  *F02B 15/00* (2006.01)
  *F01L 9/04* (2006.01)
(52) U.S. Cl. ............ 123/432; 123/90.11; 123/302; 123/308
(58) Field of Classification Search .......... 123/302, 123/308, 568.11, 568.14, 90.15, 90.16, 90.17, 123/432, 90.11, 345–348
See application file for complete search history.

(56) References Cited

U.S. PATENT DOCUMENTS

| | | | | |
|---|---|---|---|---|
| 4,494,493 A | * | 1/1985 | Morikawa et al. | 123/184.52 |
| 4,520,775 A | * | 6/1985 | Nakamura | 123/308 |
| 4,924,840 A | * | 5/1990 | Wade | 123/568.19 |
| 5,379,743 A | * | 1/1995 | Stokes et al. | 123/308 |
| 5,765,525 A | * | 6/1998 | Ma | 123/308 |
| 5,979,399 A | * | 11/1999 | Piock et al. | 123/301 |
| 6,062,192 A | * | 5/2000 | Wirth et al. | 123/295 |
| 6,125,817 A | * | 10/2000 | Piock et al. | 123/301 |
| 6,135,088 A | * | 10/2000 | Duret | 123/430 |
| 6,213,086 B1 | * | 4/2001 | Chmela et al. | 123/276 |
| 6,295,973 B1 | * | 10/2001 | Yang | 123/543 |
| 6,390,057 B2 | * | 5/2002 | Yoshizawa et al. | 123/295 |
| 6,520,146 B2 | * | 2/2003 | Laimbock | 123/308 |
| 6,619,254 B2 | * | 9/2003 | Chmela et al. | 123/276 |
| 6,675,579 B1 | * | 1/2004 | Yang | 60/599 |
| 6,752,123 B2 | * | 6/2004 | Unger et al. | 123/305 |
| 7,080,613 B2 | * | 7/2006 | Kuo et al. | 123/64 |
| 7,128,062 B2 | * | 10/2006 | Kuo et al. | 123/568.14 |
| 7,137,381 B1 | * | 11/2006 | Wakeman et al. | 123/399 |
| 2003/0131805 A1 | * | 7/2003 | Yang | 123/27 R |

* cited by examiner

*Primary Examiner*—Hai Huynh
(74) *Attorney, Agent, or Firm*—Diana Brehop; Dickinson Wright PLLC

(57) ABSTRACT

An intake and exhaust system for a dual mode HCCI engine, which provides superior intake temperature control and homogeneity for engine operation in SI and HCCI modes, as well as during transition between SI and HCCI modes and vice-versa. The system includes adjusted intake cam movement event lengths for intake valve operation at specified modes of operation. The system further includes at least one cam profile switching device operatively connected to intake and exhaust valves in an engine for controlling event length, maximum lift, and valve opening/closing timings for the intake and exhaust valves. The system yet further includes a bifurcated intake system and camless valve actuators for controlling intake valves for facilitating operation in SI or HCCI modes, as well as transition between SI and HCCI modes and vice-versa.

17 Claims, 15 Drawing Sheets

| LIFT PROFILE | EVENT LENGTH (CAD) | NORMALIZED VALVE MAX. LIFT | VALVE OPEN TIMING | VALVE CLOSE TIMING |
|---|---|---|---|---|
| INTAKE IC-OUTER | 280 ~ 320 | 1 | 0 ~ 15 CAD BTDC | 95 ~ 125 CAD ABDC |
| INTAKE IC-INNER | 150 ~ 210 | 0.3 ~ 0.7 | -50 ~ 0 CAD BTDC | 25 ~ 45 CAD ABDC |
| INTAKE IH | 170 ~ 210 | 1 | -35 ~ 0 CAD BTDC | 25 ~ 45 CAD ABDC |
| EXHAUST E-OUTER | 230 ~ 250 | 1 | 50 ~ 70 CAD BBDC | 0 ~ 20 CAD ATDC |
| EXHAUST E-INNER | 190 ~ 220 | 0.8 ~ 0.95 | 40 ~ 60 CAD BBDC | -35 ~ 0 CAD ATDC |

FIG. 5(C)

| LIFT PROFILE | EVENT LENGTH (CAD) | NORMALIZED VALVE MAX. LIFT | VALVE OPEN TIMING | VALVE CLOSE TIMING |
|---|---|---|---|---|
| INTAKE IC-OUTER | 280 ~ 320 | 1 | 0 ~ 15 CAD BTDC | 95 ~ 125 CAD ABDC |
| INTAKE IC-INNER | 150 ~ 210 | 0.3 ~ 0.7 | -50 ~ 0 CAD BTDC | 25 ~ 45 CAD ABDC |
| INTAKE IH-OUTER | 170 ~ 210 | 0.8 ~ 0.95 | -35 ~ 0 CAD BTDC | 25 ~ 45 CAD ABDC |
| INTAKE IH-INNER | < 180 | < 0.2 | -60 ~ 25 CAD BTDC | 0 ~ 25 CAD ABDC |
| EXHAUST E-OUTER | 230 ~ 250 | 1 | 50 ~ 70 CAD BBDC | 0 ~ 20 CAD ATDC |
| EXHAUST E-OUTER | 190 ~ 220 | 0.8 ~ 0.95 | 40 ~ 60 CAD BBDC | -35 ~ 0 CAD ATDC |

FIG. 8(C)

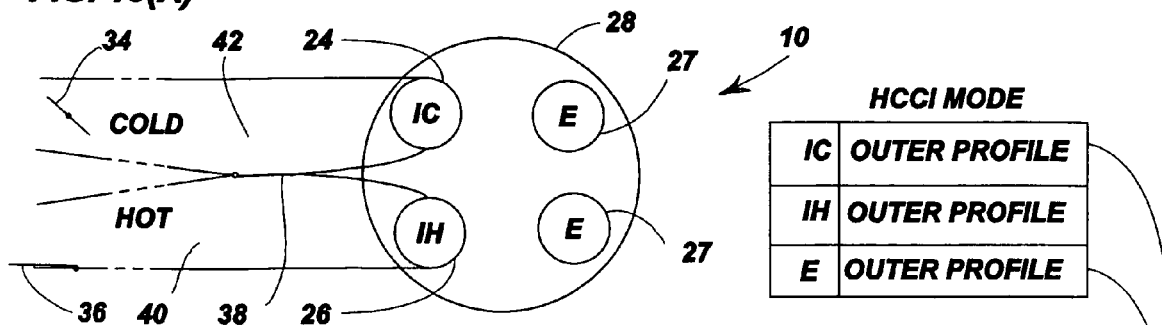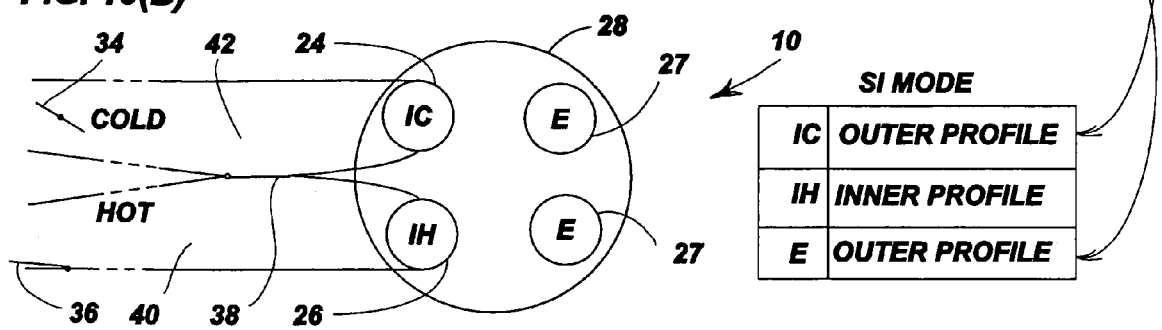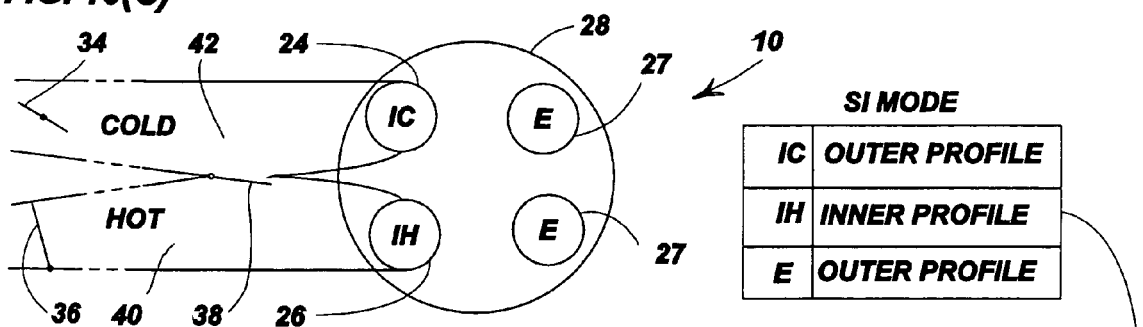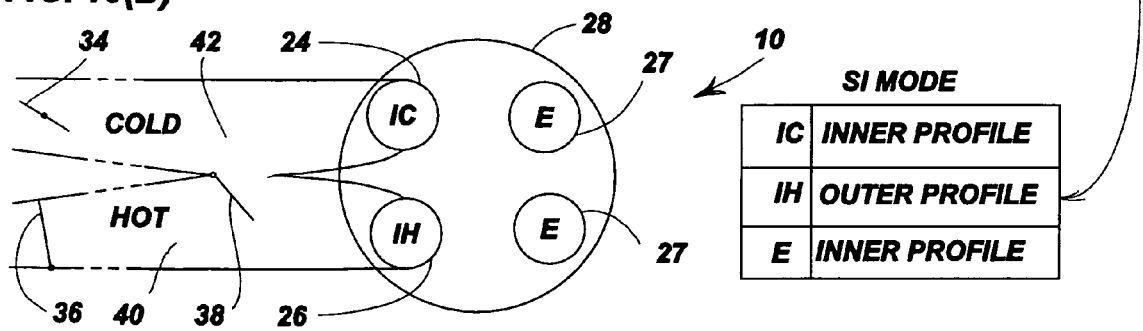

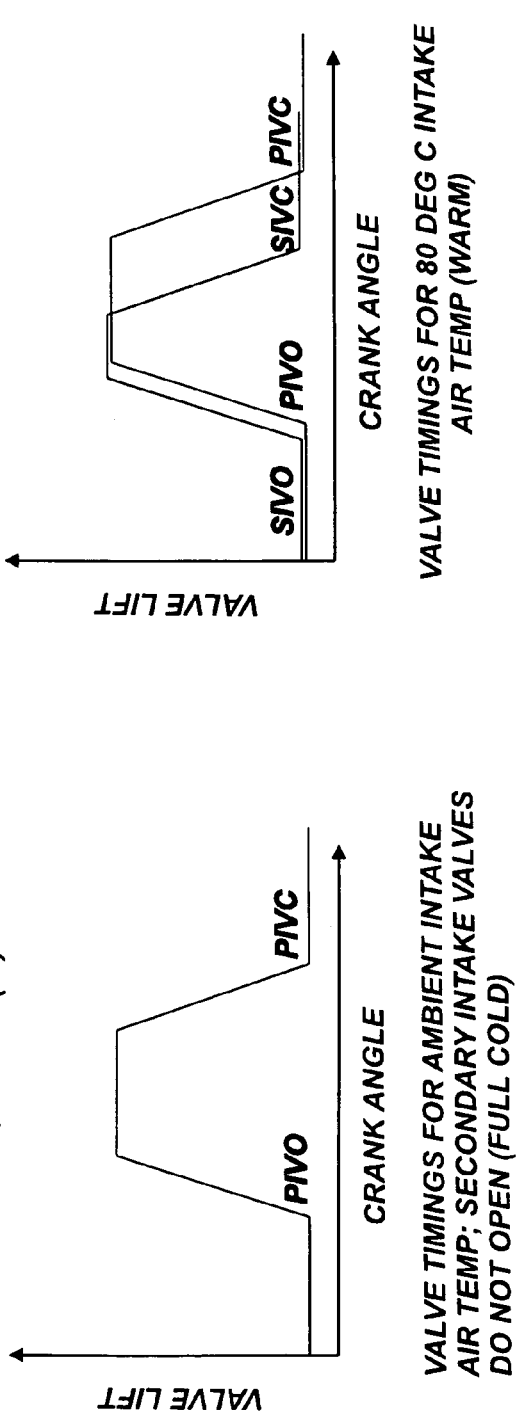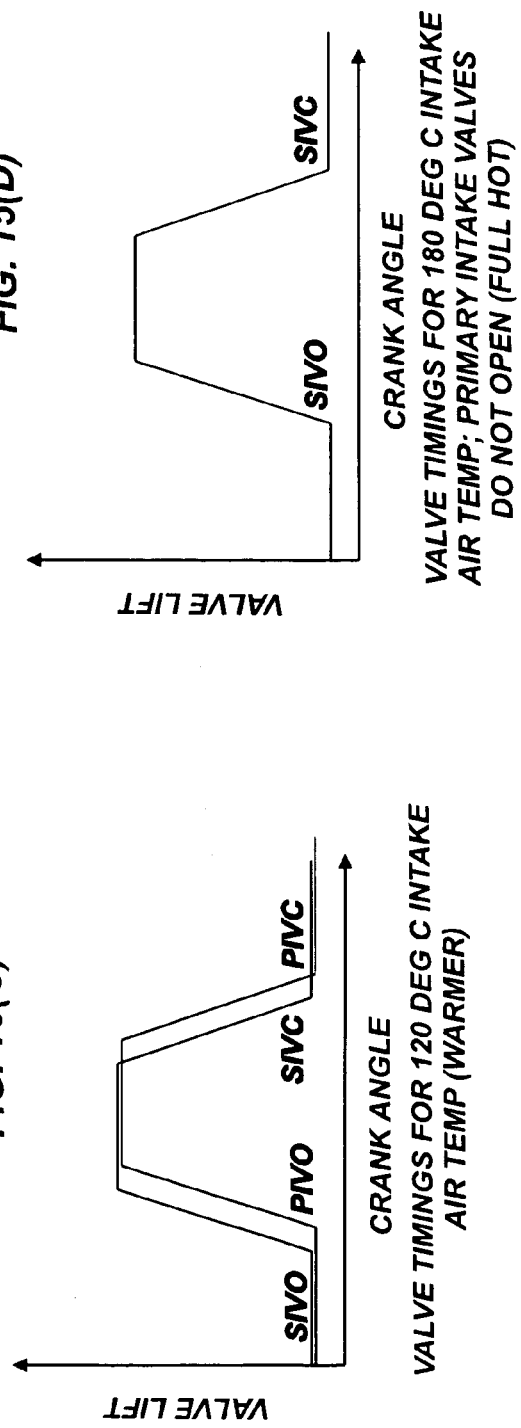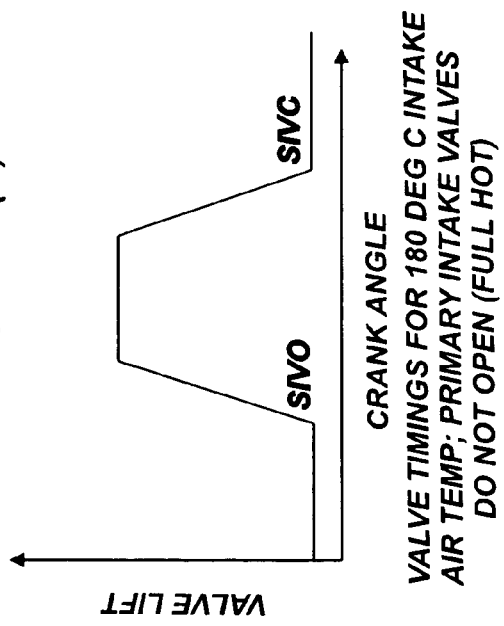

METHOD AND APPARATUS FOR CONTROLLING OPERATION OF DUAL MODE HCCI ENGINES

CROSS-REFERENCE TO RELATED APPLICATIONS

This is a divisional of U.S. patent application Ser. No. 10/708,345 filed on Feb. 25, 2004, now abandoned.

BACKGROUND OF INVENTION a. Field of Invention

The invention relates generally to intake and exhaust systems for engines, and, more particularly to the control of an intake and exhaust system for a dual mode HCCI engine, which provides superior intake temperature control and homogeneity for engine operation in SI and HCCI modes, as well as during transition between SI and HCCI modes and vice-versa.

b. Description of Related Art

Compared to conventional engines, homogeneous charge compression ignition (HCCI) engines potentially have high efficiency, very low emissions of oxides of nitrogen (NOx) and particulates, and relatively low cost. HCCI engines however generally operate over the same operating range, with regard to speed and torque, as conventional SI or diesel engines, for achieving the same vehicle performance. Because HCCI is limited by harsh combustion at higher torques, it is common for the engine to employ both SI and HCCI combustion mode technology. At medium torque, the engine can operate in HCCI mode to achieve high fuel efficiency and low NOx emissions. At higher torques however, the combustion mode of the engine is typically switched to SI mode. Hence, there exists a need to improve upon existing, or alternatively, develop new methods and mechanisms for optimal engine operation in HCCI and SI modes, as well as during HCCI and SI combustion mode switching.

For combustion in an HCCI engine with a limited compression ratio, the gas temperature when the piston is at top dead center (TDC) should be high enough (i.e. about 1000K) for autoignition. The high temperature may be realized by using higher compression ratio and/or higher charge temperature before compression. In general, the lower the torque, the higher the intake temperature should preferably be.

For typical operation, the air-fuel mixture in a dual combustion engine in HCCI mode is diluted by air or by exhaust gas recirculation (EGR) through the use of high intake pressure (i.e. unthrottled operation at medium torque) to suppress NOx formation. In contrast, the intake temperature of a dual combustion engine in SI mode should preferably be low enough (i.e. close to ambient temperature) to avoid knocking, the compression ratio should be limited (i.e. CR<~11:1), and the air-fuel mixture should preferably be at, or close to, stoichiometric. Thus, when a dual combustion engine is switching from HCCI mode to SI mode, the inlet temperature should preferably decrease quickly and the intake pressure should preferably also decrease quickly to restrict the intake airflow to form a stoichiometric mixture at a medium torque.

Another concern with dual mode HCCI engines is in the heterogeneity of the temperature distribution in a cylinder, which is known to affect the overall HCCI combustion rate. In HCCI mode, autoignition first starts at the hot regions within a cylinder, followed by autoignition in the cold regions. Thus, the overall combustion rate in a cylinder can be decreased due to heterogeneity of the temperature distribution within a cylinder.

In addition to the heterogeneity of the temperature distribution in a cylinder, effective intake temperature control is also of importance in a dual combustion HCCI engine. For example, in order to promote spontaneous HCCI combustion, it is necessary to maintain the homogeneous air/fuel mixture at a certain temperature so the active radicals will auto-ignite at the correct time in the cycle (i.e. proper combustion phasing). If the temperature is too high, the radicals can autoignite too early, creating excessive peak pressures, poor efficiency and other issues (i.e. engine damage). If the temperature is too low, the radicals may not combust at all, creating a misfire condition. Moreover, the required temperature varies with engine condition (i.e. speed, load, EGR, A/F ratio etc.).

Accordingly, the intake/exhaust system for a dual-mode HCCI engine can be relatively complicated and can include several factors which can effect the performance thereof, as evidenced by the aforementioned discussion.

Various related-art intake/exhaust systems for HCCI engines are known and disclosed, for example, in U.S. Pat. No. 6,295,973 to Yang, assigned to the assignee of the present application, and U.S. Pat. No. 6,276,334 to Flynn, U.S. patent application Ser. No. 09/573,743, and SAE paper No. 2002-01-0105, the respective disclosures of which are incorporated herein in their entirety by reference.

U.S. Pat. No. 6,295,973 to Yang, for example, discloses an intake system for an HCCI engine, which proposes using the waste thermal energy in the coolant and exhaust gases to heat the intake air and control the intake air temperature by mixing the heated and un-heated air streams with different mass ratios of the two air streams. U.S. Pat. No. 6,276,334 to Flynn discloses that varying the opening and closing timing of intake valves can be used to advance or retard the combustion event as desired. One drawback with the invention of Flynn is that it requires the continuous varying of valve timing, which can be difficult to implement for the HCCI and SI combustion mode transition region.

In order to improve upon the intake/exhaust systems of dual combustion engines, related inventions have tested HCCI-SI dual-mode engines with negative valve overlap. In these tests however, the engine geometric compression ratio remains low (CR<~12:1), and the effective compression ratio for both HCCI and SI combustion remains essentially unchanged. Further, the results from these tests are not directly applicable to engines with a high geometric compression ratio (CR>~15:1). Additionally, currently available HCCI-SI dual-mode engines rely fully on the hot residuals for autoignition, hence include a large negative valve overlap, which should preferably be avoided or minimized.

Lastly, in pending patent application Ser. No. 09/573,743, which is co-owned by the Assignee herein and the disclosure of which is incorporated by reference, HCCI-SI dual-mode engine operation strategies and mechanisms based on variable cam timing (VCT) are proposed. For the invention disclosed in application Ser. No. 09/573,743, the cam phasing speed can be of importance during combustion mode transition.

Based upon the aforementioned factors and concerns, there remains a need for a system for precisely controlling each cylinder's inlet air temperature and density in order to promote efficient and stable HCCI combustion, an intake system/strategy that can control both the overall air-fuel charge temperature and heterogeneity of temperature distribution in a cylinder, as well as a system which can facilitate HCCI-SI combustion mode transition, the system being structurally and economically feasible to manufacture and install, and the system efficiently and reliably achieving the aforementioned requirements for the relatively complicated operation of a dual-mode HCCI engine.

SUMMARY OF INVENTION

The invention solves the problems and overcomes the drawbacks and deficiencies of prior art intake and exhaust systems by providing novel intake and exhaust systems for a dual mode HCCI engine, which provide superior intake temperature and pressure control for engine operation in SI and HCCI modes, as well as during transition between SI and HCCI modes.

Thus, exemplary aspects of the present invention are to provide a system for precisely controlling each cylinder's inlet air temperature and density in order to promote efficient and stable HCCI combustion, an intake system/strategy that can control both the overall air-fuel charge temperature and the heterogeneity of temperature distribution in a cylinder, as well as a system which can facilitate a HCCI-SI combustion mode transition.

The invention achieves the aforementioned exemplary aspects by providing an intake/exhaust system for a dual-mode homogeneous charge compression ignition (HCCI) engine operable in SI and HCCI modes. The system may include at least one cylinder including at least one intake valve and at least one exhaust valve, and at least one cam operatively connected to the intake and exhaust valves. In SI mode, the cam may operate the intake valve such that an intake cam movement event length is approximately 280 to 320 cad.

For the system described above, the engine may further include a piston disposed within the cylinder and including top dead center (TDC) and bottom dead center (BDC) positions. In SI mode, the system may include an intake valve closing time of approximately 90 to 120 cad after BDC using the extended intake cam movement event length of approximately 280 to 320 cad. In HCCI mode, the system may include an exhaust valve opening time of approximately 20 to 60 cad before BDC, and an intake valve closing time of approximately 20 to 50 cad after BDC. Moreover, in HCCI mode, the system may include exhaust and intake valve movement including no overlap, or alternatively, exhaust and intake valve movement including a negative valve overlap of less than approximately 60 cad.

The invention yet further provides an intake/exhaust system for a dual-mode homogeneous charge compression ignition (HCCI) engine operable in SI and HCCI modes. The system may include at least one cylinder including at least one intake valve and at least one exhaust valve, and at least one cam profile switching device operatively connected to at least one of the intake and exhaust valves. The system may further include at least one cold-air duct connected to the cylinder for supplying cold air to the cylinder upon opening of the intake valve and a cold-air throttle, at least one hot-air duct connected to the cylinder for supplying heated air to the cylinder upon opening of the intake valve and a hot-air throttle, and at least one check valve connected between the cold and hot-air ducts for permitting flow of air between the ducts.

For the system described above, the cam profile switching device may be a roller-roller two-step finger follower. The system may further include a first cam profile switching device operatively connected to a cold intake valve, and a second cam profile switching device operatively connected to at least two exhaust valves. The first cam profile switching device may switch an event length of the cold intake valve from approximately 280-320 cad to approximately 150-210 cad, and the second cam profile switching device may switch an event length of the exhaust valves from approximately 230-250 cad to approximately 190-220 cad, for combustion mode transition from SI to HCCI mode, and vice-versa for combustion mode transition from HCCI to SI mode. The first cam profile switching device may switch a normalized valve maximum lift of the cold intake valve from approximately 1 to approximately 0.3-0.7, and the second cam profile switching device may switch a normalized valve maximum lift of the exhaust valves from approximately 1 to approximately 0.8-0.95, for combustion mode transition from SI to HCCI mode, and vice-versa for combustion mode transition from HCCI to SI mode. The first cam profile switching device may switch a valve opening time of the cold intake valve from approximately 0-15 cad to approximately −50-0 cad at top dead center, and the second cam profile switching device may switch a valve opening time of the exhaust valves from approximately 50-70 cad to approximately 40-60 cad at bottom dead center, for combustion mode transition from SI to HCCI mode, and vice-versa for combustion mode transition from HCCI to SI mode. The first cam profile switching device may switch a valve closing time of the cold intake valve from approximately 95-125 cad to approximately 25-45 cad at bottom dead center, and the second cam profile switching device may switch a valve closing time of the exhaust valves from approximately 0-20 cad to approximately −35-0 cad at top dead center, for combustion mode transition from SI to HCCI mode, and vice-versa for combustion mode transition from HCCI to SI mode.

For the system described above, the system may further include first, second and third cam profile switching devices operatively connected to a cold intake valve, a hot intake valve and at least two exhaust valves, respectively. The second cam profile switching device may switch an event length of the hot intake valve from approximately 170-210 cad to approximately less than 180 cad to begin combustion mode transition from SI to HCCI mode, and vice-versa to begin combustion mode transition from HCCI to SI mode. The first cam profile switching device may switch an event length of the cold intake valve from approximately 280-320 cad to approximately 150-210 cad, the second cam profile switching device may switch an event length of the hot intake valve from approximately less than 180 cad to approximately 170-210 cad, and the third cam profile switching device may switch an event length of the exhaust valves from approximately 230-250 cad to approximately 190-220 cad, for combustion mode transition from SI to HCCI mode, and vice-versa for combustion mode transition from HCCI to SI mode.

For the system described above, the second cam profile switching device may switch a normalized valve maximum lift of the hot intake valve from approximately 0.8-0.95 to approximately less than 0.2 to begin combustion mode transition from SI to HCCI mode, and vice-versa to begin combustion mode transition from HCCI to SI mode. The first cam profile switching device may switch a normalized valve maximum lift of the cold intake valve from approximately 1 to approximately 0.3-0.7, the second cam profile switching device may switch a normalized valve maximum lift of the hot intake valve from approximately less than 0.2 to approximately 0.8-0.95, and the third cam profile switching device may switch a normalized valve maximum lift of the exhaust valves from approximately 1 to approximately 0.8-0.95, for combustion mode transition from SI to HCCI mode, and vice-versa for combustion mode transition from HCCI to SI mode.

For the system described above, the second cam profile switching device may switch a valve opening time of the hot intake valve from approximately −35-0 cad to approximately −60-25 cad at top dead center to begin combustion mode transition from SI to HCCI mode, and vice-versa to begin combustion mode transition from HCCI to SI mode. The first cam profile switching device may switch a valve opening time of the cold intake valve from approximately 0-15 cad to approximately −50-0 cad at top dead center, the second cam profile switching device may switch a valve opening time of the hot intake valve from approximately −60-25 cad to approximately −35-0 cad at top dead center, and the third cam profile switching device may switch a valve opening time of the exhaust valves from approximately 50-70 cad to approximately 40-60 cad at bottom dead center, for combustion mode transition from SI to HCCI mode, and vice-versa for combustion mode transition from HCCI to SI mode.

For the system described above, the second cam profile switching device may switch a valve closing time of the hot intake valve from approximately 25-45 cad to approximately 0-25cad at bottom dead center to begin combustion mode transition from SI to HCCI mode, and vice-versa to begin combustion mode transition from HCCI to SI mode. The first cam profile switching device may switch a valve closing time of the cold intake valve from approximately 95-125 cad to approximately 25-45 cad at bottom dead center, the second cam profile switching device may switch a valve closing time of the hot intake valve from approximately 0-25 cad to approximately 25-45 cad at bottom dead center, and the third cam profile switching device may switch a valve closing time of the exhaust valves from approximately 0-20 cad to approximately −35-0 cad at top dead center, for combustion mode transition from SI to HCCI mode, and vice-versa for combustion mode transition from HCCI to SI mode.

The invention yet further provides a method of combustion mode transition in a dual-mode homogeneous charge compression ignition (HCCI) operable in SI and HCCI modes. The method may include the steps of providing an intake/exhaust system including at least one cylinder including at least one intake valve and at least one exhaust valve, at least one cam profile switching device operatively connected to at least one of the intake and exhaust valves, at least one cold-air duct connected to the cylinder for supplying cold air to the cylinder upon opening of the intake valve and a cold-air throttle, at least one hot-air duct connected to the cylinder for supplying heated air to the cylinder upon opening of the intake valve and a hot-air throttle, and at least one check valve connected between the cold and hot-air ducts for permitting flow of air between the ducts. The method may further include the step of operating the cold-air and hot-air throttles, and the check valve to control temperature and flow of air supplied to the cylinder.

The invention yet further provides an intake/exhaust system for a dual-mode homogeneous charge compression ignition (HCCI) engine operable in SI and HCCI modes. The system may include a source for supplying air to the engine, a coolant heat exchanger for cooling air from the source, the cooled air being supplied to an exhaust heat exchanger, and a camless valve actuator for controlling at least one hot and at least one cold intake valve. The system may further include at least one control valve for controlling air through the exhaust heat exchanger and the source to supply heated air via a hot intake manifold directly to at least one cylinder upon opening of the hot intake valve, and a cold intake manifold for directly supplying air from the source to the cylinder upon opening of the cold intake valve so as to supply air at a first temperature to the engine for operation in SI mode and air at a second temperature to the engine for operation in HCCI mode.

The invention further provides a method of combustion mode transition in a dual-mode homogeneous charge compression ignition (HCCI) engine operable in SI and HCCI modes. The method may include the steps of supplying air to the engine by a source, cooling the supplied air by a coolant heat exchanger, supplying the cooled air to an exhaust heat exchanger, and controlling at least one hot and at least one cold intake valve by a camless valve actuator. The method may further include controlling air through the exhaust heat exchanger and the source by at least one control valve to supply heated air via a hot intake manifold directly to at least one cylinder upon opening of the hot intake valve, and supplying air from the source to the cylinder via a cold intake manifold upon opening of the cold intake valve so as to supply air at a first temperature to the engine for operation in SI mode and air at a second temperature to the engine for operation in HCCI mode.

For the method described above, for operation in SI mode, the method may further include closing the hot intake valve. For operation in HCCI mode, the method may further include closing the cold intake valve. Lastly, for transition from SI to HCCI mode and vice-versa, the method may further include adjusting valve timings of the cold and hot intake valves to obtain a required temperature for operation in SI or HCCI mode.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIGS. 5(a)-5(c) are a diagram of cam profile switching, valve lift curves, and table for valve timings, respectively, for the second embodiment of the present invention;

FIGS. 8(a)-8(c) are a diagram of a third embodiment of the present invention for cam profile switching, valve lift curves, and table for valve timings, respectively;

FIGS. 10(a)-10(d) are schematic diagrams of the hot/cold air throttles for the third embodiment and the mode transition steps from HCCI to SI;

FIGS. 15(a)-(d) are schematic diagrams of exemplary valve timing selections according to the fourth embodiment of the present invention.

DETAILED DESCRIPTION OF THE PREFERRED EMBODIMENTS

Figure 1:
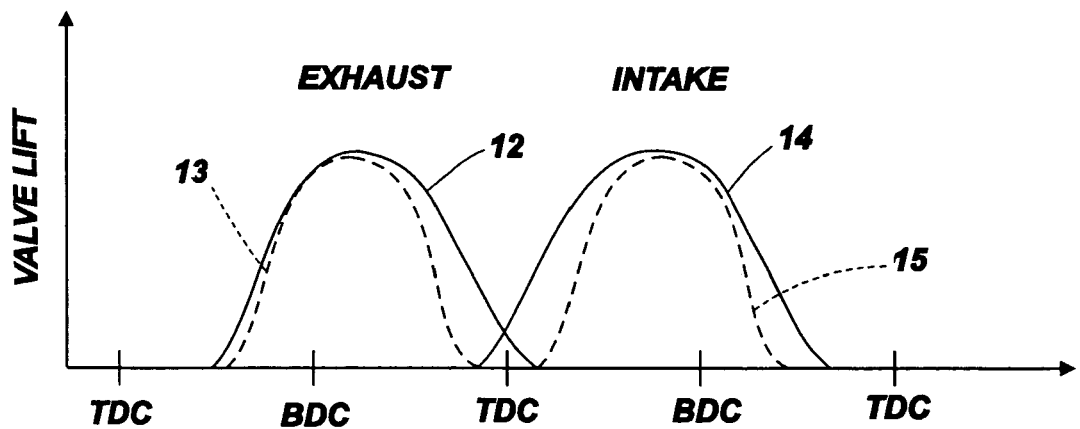
FIG. 1 is a schematic diagram of a first embodiment of an intake and exhaust system according to the present invention, illustrating exhaust valve lifts in SI (solid lines) and HCCI (dashed lines) combustion modes.

Referring now to the drawings wherein like reference numerals designate corresponding parts throughout the several views, FIGS. 1-16 illustrate components and schematic diagrams for an intake/exhaust system according to the present invention, generally designated 10.

Figure 2:
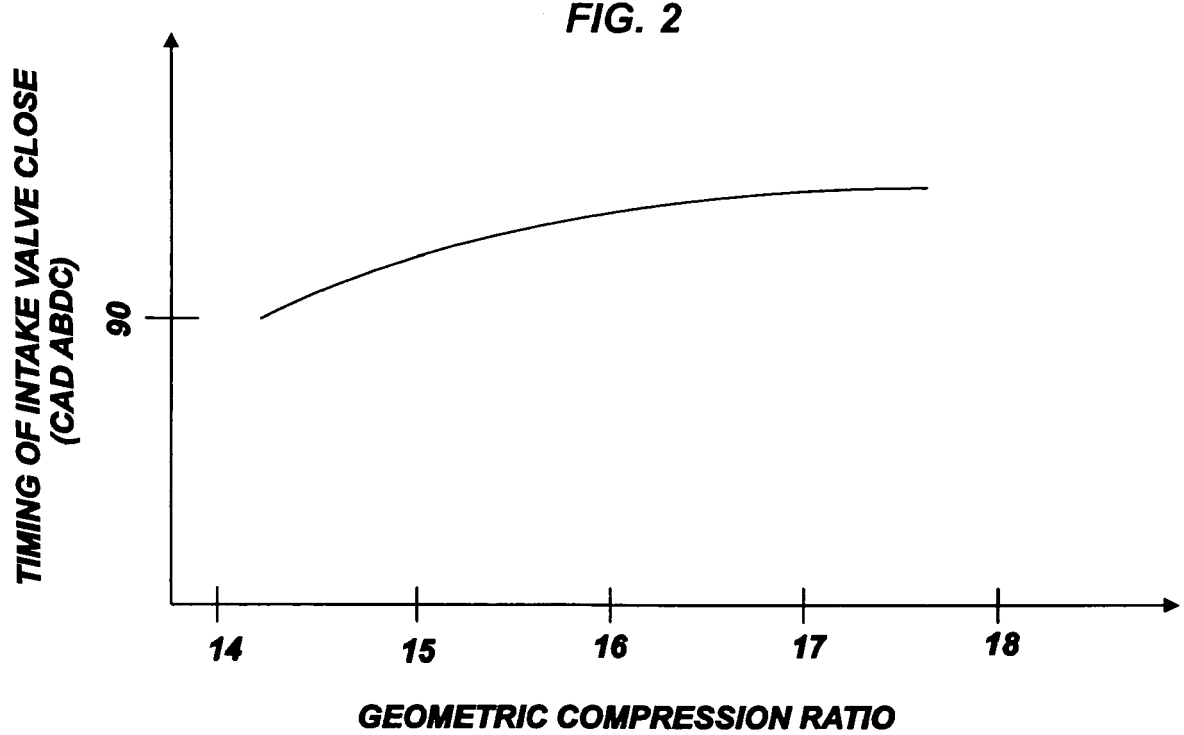
FIG. 2 is a schematic diagram of the relationship between intake valve closing (IVC) timing and engine geometric compression ratio (Later IVC corresponds to longer intake cam event length)
Figure 3:
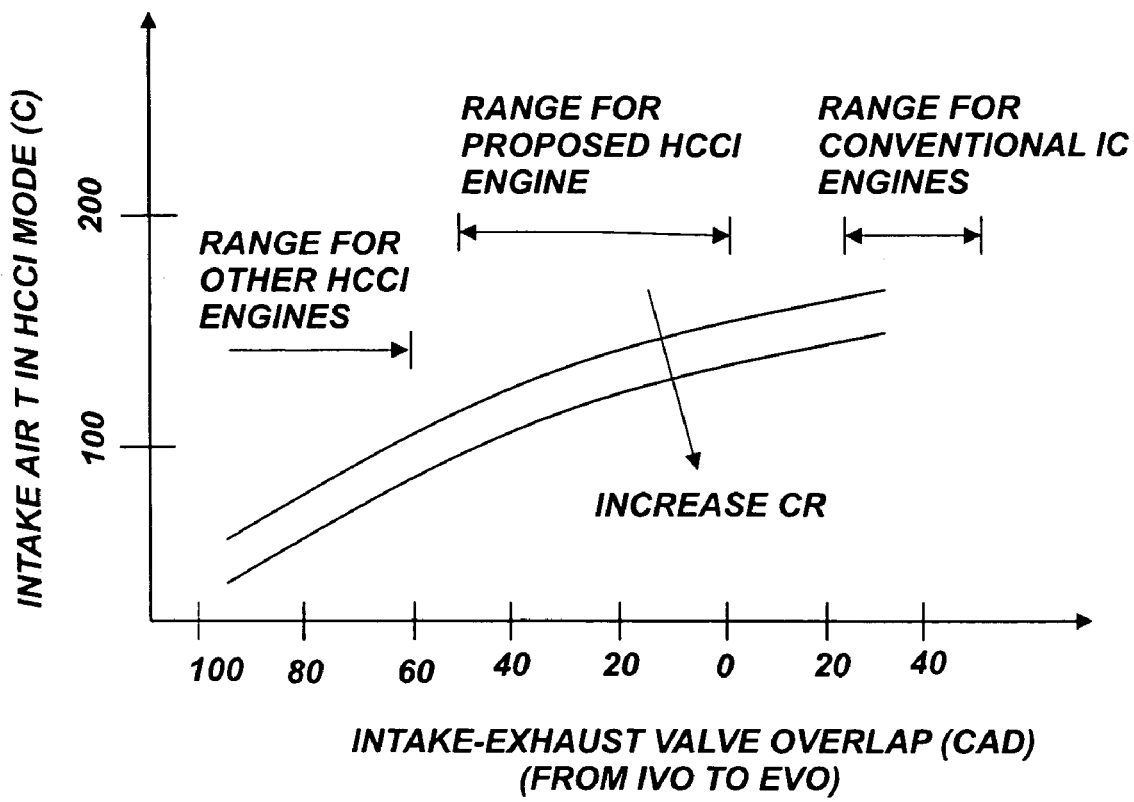
FIG. 3 is a schematic diagram of the relationship between valve overlap, engine compression ratio, and intake air temperature.

Referring to FIGS. 1-3, a first embodiment of intake/exhaust system 10 is disclosed. For the embodiment of FIGS. 1-3, generally, there is described an HCCI-SI dual-mode engine system with a geometric compression ratio of approximately 15:1, which is higher than those of conventional SI engines. In order to operate an engine in both HCCI and SI modes, to achieve HCCI-SI combustion mode transition, and to operate an engine at high load (~10 bar BMEP), the proposed engine system according to the present invention has the following features discussed herein in reference to FIGS. 1-3.

As illustrated in FIG. 1, there are disclosed proposed engine intake and exhaust valve timings and lifts according to the present invention. The valve lift profiles illustrated in FIG. 1 allow the use of cam profile switching as one of the major means to change the combustion mode between HCCI and SI by allowing the use of high engine geometric compression ratio. In the embodiments discussed herein, the cam profile switching devices may for example be a switching device such as a "roller-roller two-step finger follower." The valve lift profiles illustrated in FIG. 1 also improve the performance of an engine in both HCCI and SI modes. The valve timings illustrated in FIG. 2 and lifts illustrated in FIG. 1 have the characteristics discussed below, which are different from typical engines, including currently available HCCI engines.

In SI mode, as illustrated in FIG. 1, exhaust valve lift curve 12 may be fixed and be similar to that of a conventional SI engine. The intake cam event length may also be fixed, but is extended to about 280 to 320 cad for the present invention, (for a conventional SI engine, intake event length is approximately 240 cad). With the fixed intake cam event length of about 280 to 320 cad, the intake valve close time may be retarded to a fixed crank angle position, at 90 to 120 cad after bottom dead center (BDC), (for a conventional SI engine, intake valve close time is generally 50 to 70 cad after BDC).

For FIG. 1, solid lines 12, 14 respectively represent exhaust and intake valve lifts in SI combustion mode and dashed lines 13, 15 respectively represent exhaust and intake valve lifts in HCCI combustion mode. According to the proposed valve timings and lifts for the present invention, since the dashed lines for the HCCI combustion mode in FIG. 1 are under the solid lines for the SI combustion mode, cam profile switching may be used as discussed below.

As illustrated in FIG. 2, the design of the intake valve close time and the intake cam event length depends on the geometric compression ratio of the engine. It should be noted that the purpose of retarding the intake valve closing time is to reduce the effective compression ratio of the engine to avoid knocking in SI mode, not to control the autoignition event.

According to the present invention, a cam profile may be designed such that an engine preferably operates in HCCI mode for engine speeds below 4000 rpm, (in SI mode, the maximum engine speed may be about 6000 rpm). As a result, the exhaust valve opening time and intake valve closing time in HCCI mode are designed to be closer to BDC. Specifically, the cam profile may be designed such that the exhaust valve opening time may be retarded to a fixed crank angle position, at 20 to 40 cad before BDC, (for a conventional IC engine, exhaust valve opening time is at 40 to 60 cad before BDC). Further, the intake valve closing time may be advanced to a fixed crank angle position, at 20 to 40 cad after BDC, (for a conventional IC engine, intake valve closing time is at 50 to 70 cad after BDC). The advanced intake valve closing time at low engine speeds increases the effective compression ratio to promote HCCI autoignition. In HCCI mode, the aforementioned cam profile specifications at engine speeds below 4000 rpm enable valves to open and close faster than those in conventional engines at the same engine speed. These specifications are permissible because for a conventional SI engine cam design, the valve acceleration and valve seating speeds at the maximum engine speed of approximately 6000 rpm are constrained by the valve springs and noise. Thus, the maximum lifts of cams for operation in HCCI mode can remain high.

According to the present invention, for operation in HCCI mode, the exhaust and intake valve closing times may be designed at fixed crank angle positions such that the exhaust and intake events have no overlap or even have a small gap (i.e. negative valve overlap) of less than about 50 cad. The use of a small negative valve overlap increases hot residuals in the cylinder to facilitate HCCI autoignition. In some HCCI engines, the gap between the exhaust and intake events using a negative valve overlap may be larger than 60 cad. This is because HCCI engines, in which a negative valve overlap is used, rely fully on trapping hot residuals for autoignition. In contrast, the present invention uses the method discussed in U.S. Pat. No. 6,295,973 for fast intake air temperature control to promote autoignition. Trapping hot residuals for the present invention provides a means for assisting autoignition at light loads, hence a small gap may be used between valve events, or alternatively, no gap may be used.

For the present invention, as shown in FIG. 3, there is disclosed the relationship between the valve overlap, compression ratio, and the required intake air temperature for HCCI autoignition. There is further illustrated the recommended range of valve overlap for different engines. To minimize any potential engine pumping loss, the gap of valve events may be symmetric to TDC, i.e., the crank angles from exhaust valve overlap to TDC and the crank angles from TDC to intake valve overlap are equal.

In order to switch between HCCI and SI modes and to control HCCI autoignition timing, the present invention provides for the control of intake air temperature, as discussed in detail in U.S. Pat. No. 6,295,973. Briefly, according to the present invention, intake air temperature may be controlled by using the waste thermal energy in the coolant and exhaust gases to heat the intake air and control the intake air temperature by mixing the heated and un-heated air streams with different mass ratios of the two air streams, as discussed in detail in U.S. Pat. No. 6,295,973. Lastly, in order to compensate for loss of volumetric efficiency, intake air pressure may be boosted at high load.

The second embodiment of the present invention, which addresses heterogeneity of in-cylinder temperature, will be discussed in detail below in reference to FIGS. 4-7.

With regard to the second embodiment, in HCCI mode, an intake system can promote heterogeneity of the in-cylinder temperature distribution, hence reducing the overall combustion rate for a cylinder. During HCCI-SI combustion mode transition at engine speeds below 3000rpm, an intake system can promptly change the air-fuel charge temperature, the residuals ratio, the intake pressure, as well as the effective compression ratio (intake valve closing time). In SI mode at high engine speeds up to 6000 rpm, an intake system can use all (two or more) intake valves per cylinder to achieve high volumetric efficiency, and can operate with boosted intake pressure. For the present invention, it is also desirable to switch the combustion mode in different cylinders at different times to achieve a smooth transition.

Based upon the aforementioned factors, the basic approach for promoting heterogeneity of in-cylinder temperature according to the second embodiment is to control the flow of unheated (cold) air and heated (hot) air into a cylinder via different intake valves. Furthermore, for the second embodiment, the valve lift curve for the cold intake valve is preferably different than the lift curve for the hot intake valve.

Figure 4:
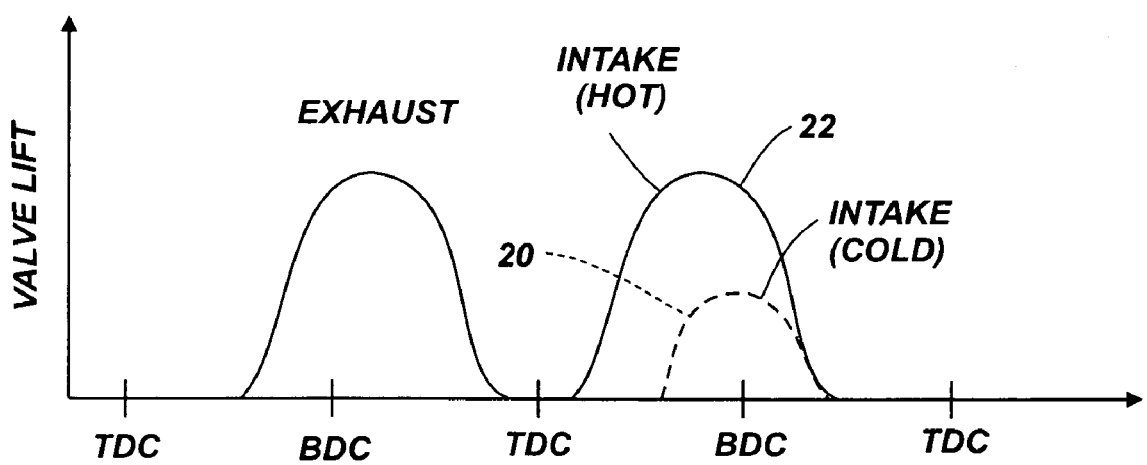
FIG. 4 is a schematic diagram of a second embodiment of the present invention of intake and exhaust valve lift curves in HCCI mode with negative valve overlap.

As shown in FIG. 4, in HCCI mode, valve lift curve 20 for the cold intake air has a smaller maximum lift with a retarded phase compared with valve lift curve 22 for the hot intake valve. Moreover, valve lift curves 20, 22 include a negative valve overlap to trap more hot residuals. Alternatively, a large valve overlap (not shown) may be used to increase the residuals ratio.

The cold intake valve lift curve and its phase may be designed such that the intake pressure of cold air in HCCI mode is similar to the intake pressure in SI mode at medium loads, at which the combustion mode is switched, such that the adjustment of the intake pressure during HCCI-SI combustion mode transition can be smaller. Since retardation of the cold valve lift curve would delay the time for cold air to enter into a cylinder, mixing of cold air with hot air and the residuals in the cylinder can be minimized. At light loads, the intake pressure for cold air may further be reduced by throttling to increase the overall fuel-air charge temperature.

Figure 5A:
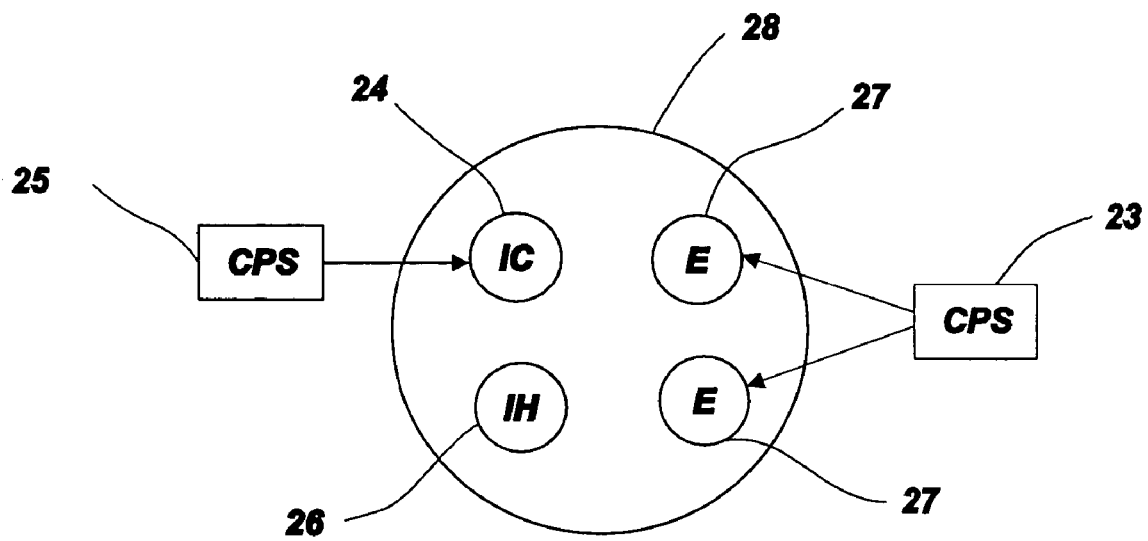
Figure 5B:
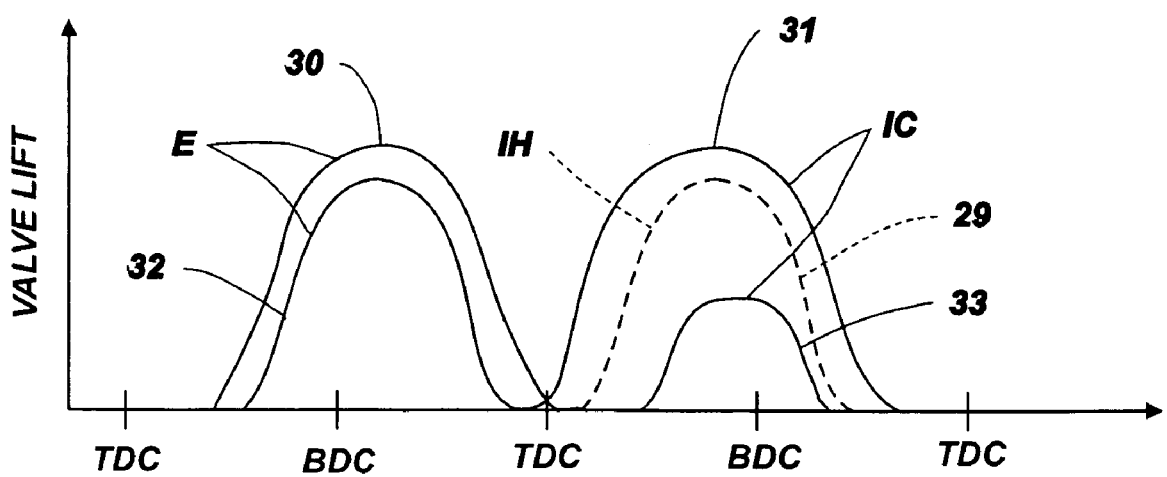

For HCCI-SI combustion mode transition, intake/exhaust system 10 according to the second embodiment uses cam profile switching devices, electric throttles (valves) and check valves. Specifically, the embodiment illustrated in FIG. 5(a) uses one cam profile switching device 23 per cylinder 28 for exhaust valves 27 and one cam profile switching device 25 per cylinder for cold intake valve 24. As illustrated in FIG. 5(b), lift curve 29 for hot intake valve 26 may be fixed. Lift curves 31, 33 for cold intake valve 24 may be switched by cam profile switching device 25 such that, as shown in the valve timing table for FIG. 5(c), the event length, normalized valve maximum life, valve opening timing and valve closing timing for intake valve 24 are switched during combustion mode transition. It is noted that lift curves 31, 33 respectively correspond to the "outer" and "inner" lift profiles for cold intake valve 24 for the table for FIG. 5(c). Furthermore, lift curves 30, 32 for exhaust valves 27 may be switched by cam profile switching device 23 such that, as also shown in the valve timing table for FIG. 5(c), the event length, normalized valve maximum life, valve opening timing and valve closing timing for exhaust valves 27 are switched during combustion mode transition. Lift curves 30, 32 respectively correspond to the "outer" and "inner" lift profiles for exhaust valves 27 for the table for FIG. 5(c).

Figure 6A:
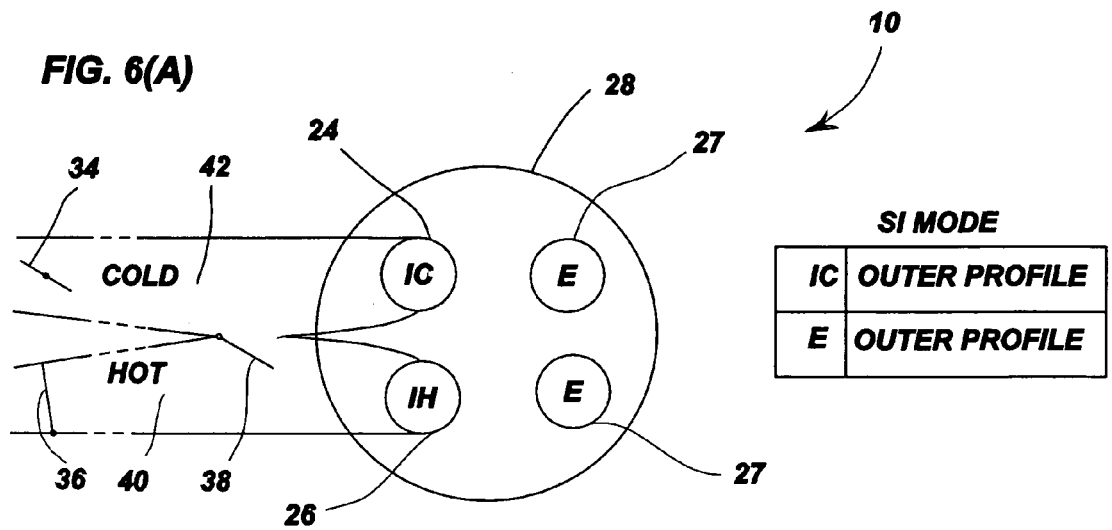
FIGS. 6(a)-6(c) are schematic diagrams of the hot/cold air throttles for the second embodiment and the mode transition steps from SI to HCCI.
Figure 6B:
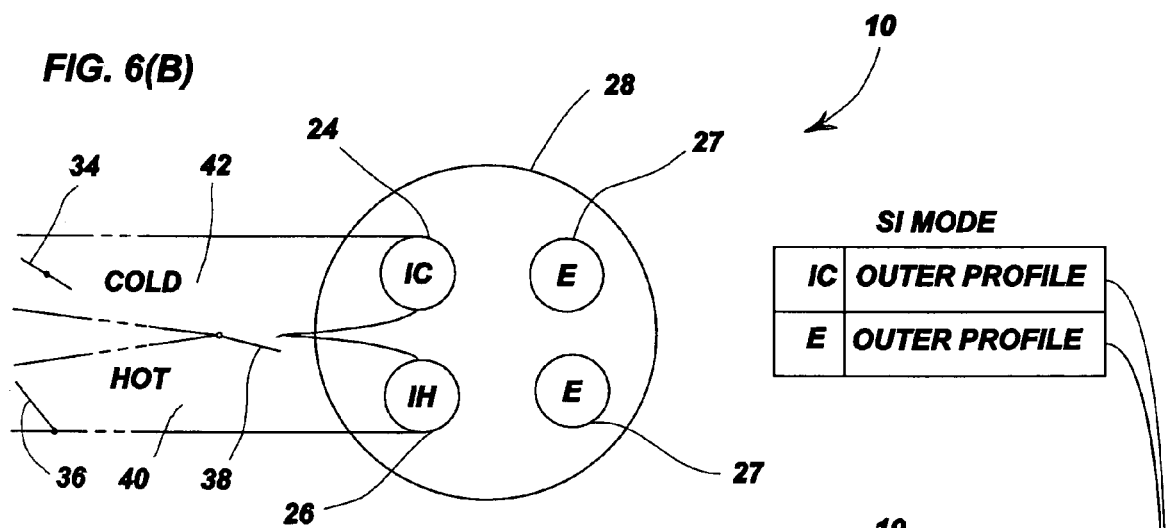
Figure 6C:
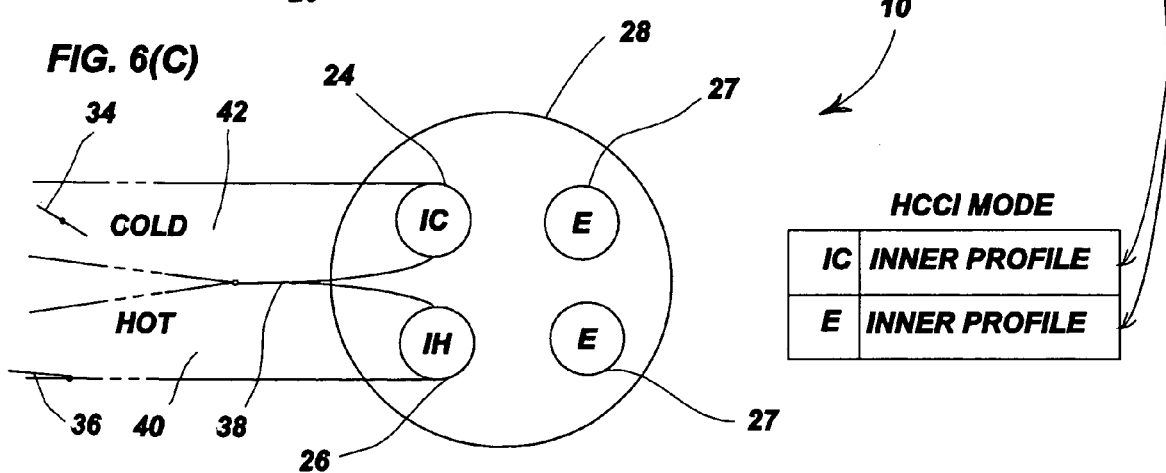

As shown in FIGS. 6(a)-6(c), the arrangement of the intake system with electric and check valves according to the second embodiment of the present invention is shown. Specifically, FIGS. 6(a)-6(c) illustrate the steps for combustion mode transition from SI to HCCI mode. At the first step for FIG. 6(a), in SI mode, both intake valves 24, 26 may be open for the cold air to flow into cylinder 28 by means of throttle 34, and check valve 38 being positioned as shown to have a high volumetric efficiency. Before the start of combustion mode transition from SI to HCCI, hot-air throttle 36 may open first as illustrated in FIG. 6(b). The delay time from the opening of hot-air throttle 36 to the time of cam profile switching for FIG. 6(c) is provided for the low-temperature air, if any, present in hot intake duct 40 to flow into cylinder 28. This delay time can be controlled by temperature measurement in hot intake duct 40. Thereafter, referring to FIGS. 5(b), 5(c), 6(b) and 6(c), the switching of cam profiles for cold intake valve 24 from lift curve 31 to lift curve 33 and the switching of cam profiles for exhaust valves 27 from lift curve 30 to lift curve 32 changes the combustion mode from SI to HCCI mode. After cam profile switching, check valve 38 may be closed automatically as shown in FIG. 6(c) because of the lower pressure in cold intake duct 42 due to throttling by cold-air throttle 34 to control the overall air-fuel charge temperature, thus completing combustion mode transition from SI to HCCI mode.

Figure 7A:
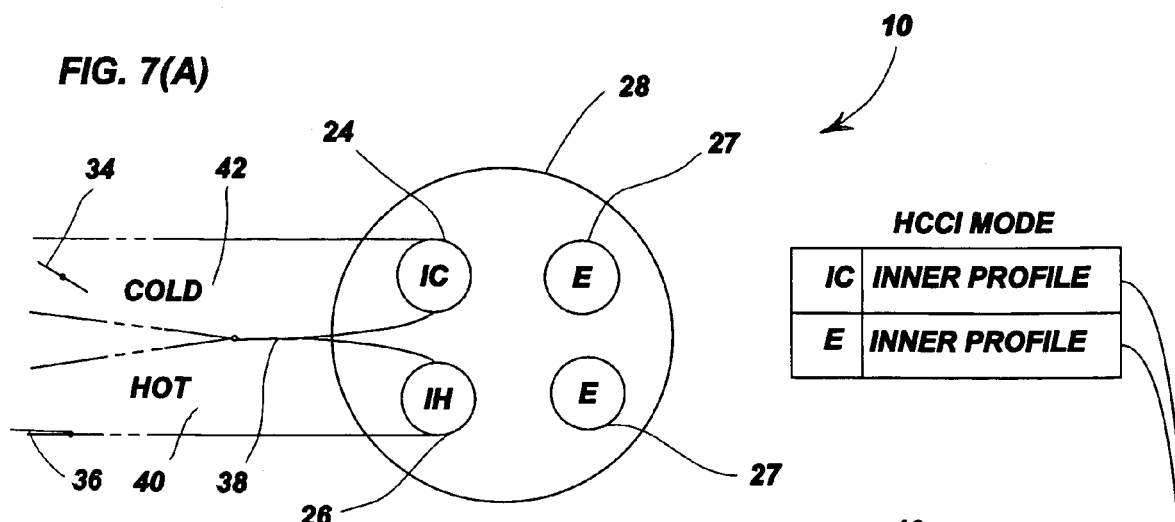
FIGS. 7(a)-7(b) are schematic diagrams of the hot/cold air throttles for the second embodiment and the mode transition steps from HCCI to SI.
Figure 7B:
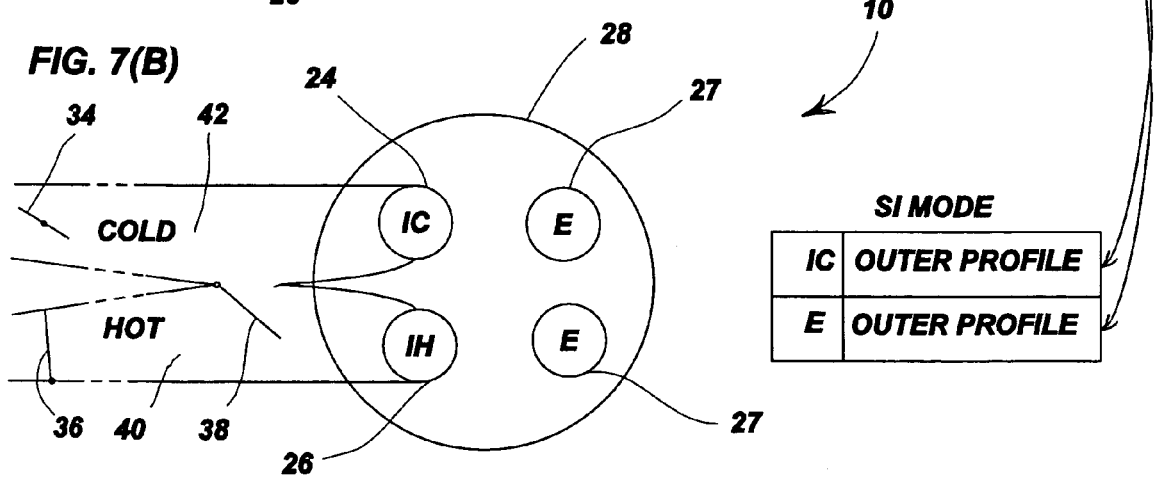

Referring next to FIGS. 7(a) and 7(b), the steps for HCCI to SI mode transition are shown. As shown in FIGS. 7(a) and 7(b), for transition from HCCI to SI mode, with cold-air throttle 34 already open, hot-air throttle 36 may be closed and check valve 38 simultaneously opened. As discussed above for transition from SI to HCCI modes, referring to FIGS. 5(b), 5(c), 6(b) and 6(c), the switching of cam profiles for cold intake valve 24 from lift curve 33 to lift curve 31 and the switching of cam profiles for exhaust valves 27 from lift curve 32 to lift curve 30 changes the combustion mode from HCCI to SI mode.

The third embodiment of the present invention, which provides for further improvement in control of the combustion mode transition, will be discussed in detail below in reference to FIGS. 8-10.

Figure 8A:
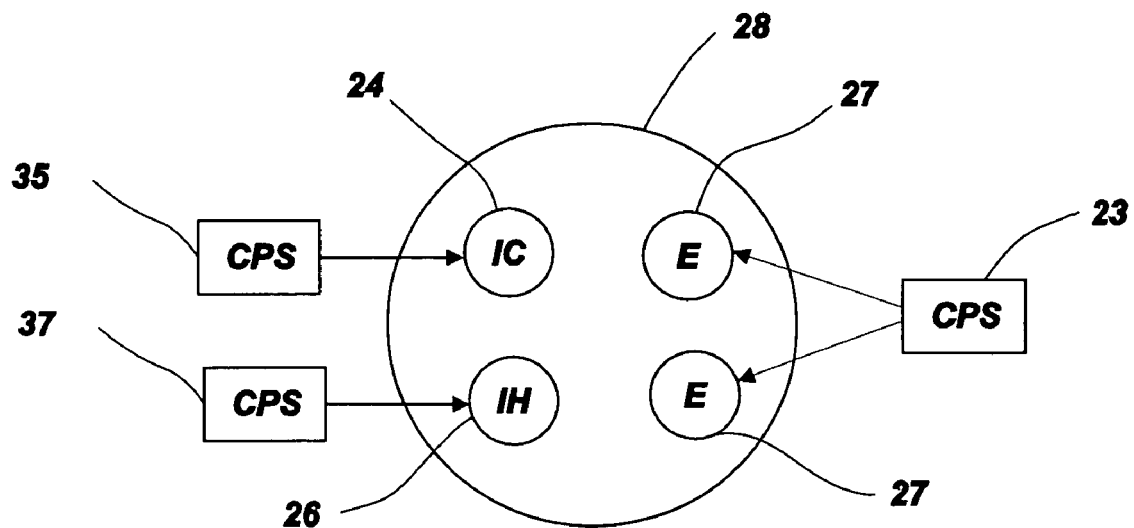
Figure 8B:
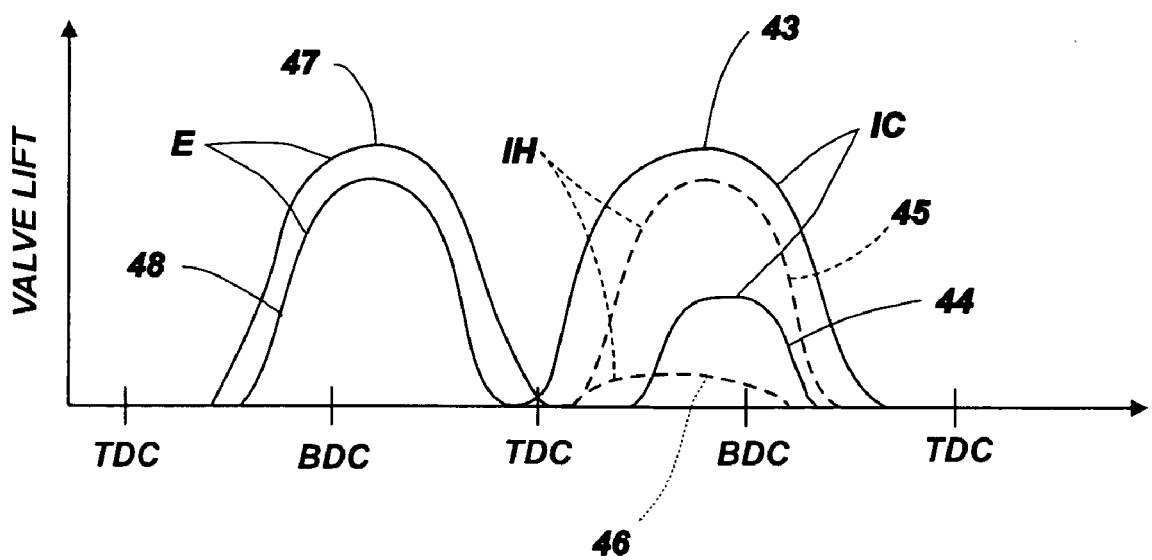

Referring to FIG. 8(a), in order to improve the control of the combustion mode transition process, the third embodiment of the present invention uses two cam profile switching devices 35, 37 per cylinder for both cold and hot intake valves 24, 26, respectively, and a single cam profile switching device 23 for exhaust valves 27. For example, whereas the second embodiment for FIG. 5(a) uses a single cam profile switching device 25 for cold intake valve 24, the third embodiment of FIG. 8(a) uses two cam profile switching devices 35, 37 per cylinder for cold and hot intake valves, 24, 26, respectively. One advantage of using two cam profile switching devices is that the change of the throttle angle may be decreased without jeopardizing engine performance.

Specifically, lift curves 43, 44 for cold intake valve 24 may be switched by cam profile switching device 35 such that, as shown in the valve timing table for FIG. 8(c), the event length, normalized valve maximum life, valve opening timing and valve closing timing for cold intake valve 24 are switched during combustion mode transition. It is noted that lift curves 43, 44 respectively correspond to the "outer" and "inner" lift profiles for cold intake valve 24 for the table for FIG. 8(c). Likewise, lift curves 45, 46 for hot intake valve 26 may be switched by cam profile switching device 37 such that, as shown in the valve timing table for FIG. 8(c), the event length, normalized valve maximum life, valve opening timing and valve closing timing for hot intake valve 26 are switched during combustion mode transition. Lift curves 45, 46 respectively correspond to the "outer" and "inner" lift profiles for hot intake valve 26 for the table for FIG. 8(c). Furthermore, lift curves 47, 48 for exhaust valves 27 may be switched by cam profile switching device 23 such that, as also shown in the valve timing table for FIG. 8(c), the event length, normalized valve maximum life, valve opening timing and valve closing timing for exhaust valves 27 are switched during combustion mode transition. Lift curves 47, 48 respectively correspond to the "outer" and "inner" lift profiles for exhaust valves 27 for the table for FIG. 8(c).

Figure 9A:
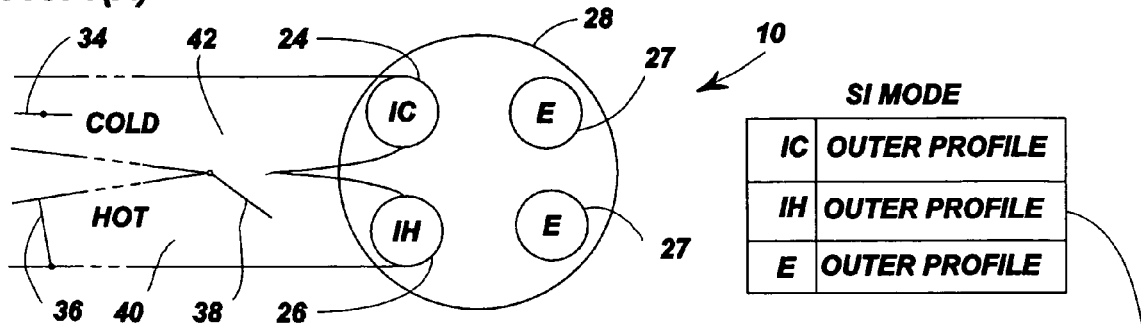
FIGS. 9(a)-9(d) are schematic diagrams of the hot/cold air throttles for the third embodiment and the mode transition steps from SI to HCCI.
Figure 9B:
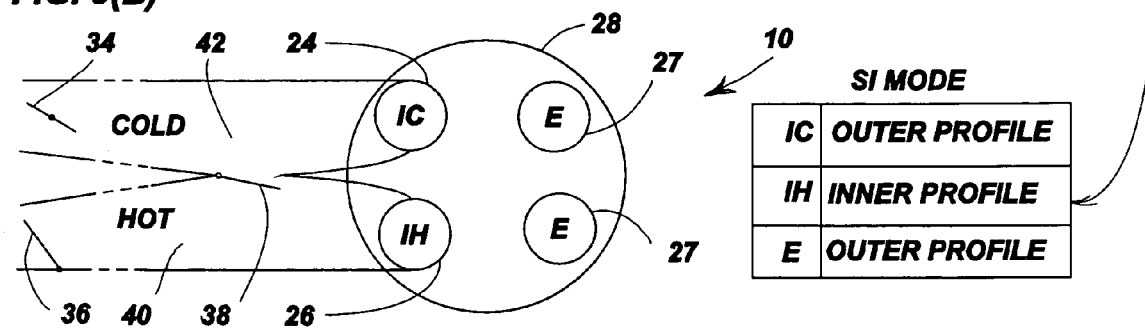
Figure 9C:
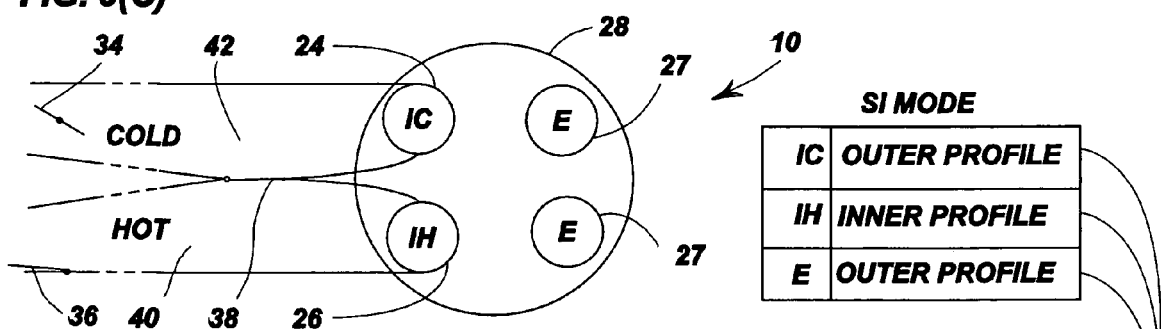
Figure 9D:
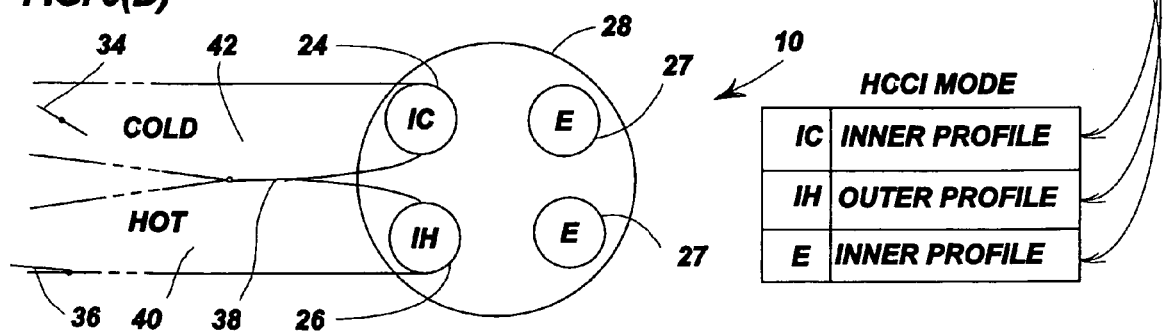

For the third embodiment of the present invention, FIGS. 9(a)-9(d) show arrangements of intake system 10 with electric throttles (valves) and check valves. FIGS. 9(a)-9(d) also show the steps for combustion mode transition from SI to HCCI mode. Specifically, for FIGS. 9(a)-9(b), in SI mode, before the start of combustion mode transition from SI to HCCI, the cam profile for hot intake valve 26 may first be switched to the inner (lower) profile. Specifically, referring to FIGS. 8(b), 8(c), 9(a) and 9(b), the cam profiles for hot intake valve 26 may be switched from lift curve 45 to lift curve 46. The low cam profile essentially closes valve 26 and stops cold intake air from flowing therethrough. This change is acceptable for SI operation at lower speed (<3000 rpm) and medium-low loads, at which volumetric efficiency is not as important as at higher speeds. Thereafter, as shown in FIG. 9(c), hot-air throttle 36 may be open, allowing low temperature air, if any, in hot air duct 40 to flow slowly into cylinder 28. Check valve 38 may automatically close due to the pressure increase in hot intake duct 40. Finally, as shown in FIG. 9(d), after hot intake duct 40 is filled with hot air, the three cam profile switching devices 23, 35 and 37 may switch the cam profiles simultaneously for all the valves, and the engine may be switched to HCCI mode. Specifically, referring to FIGS. 8(b), 8(c), 9(c) and 9(d), the cam profiles for valves 24, 26 and 27 may be respectively switched from lift curves 43, 46 and 47 to lift curves 44, 45 and 48.

As shown next in FIGS. 10(a)-10(d), combustion mode transition from HCCI to SI is illustrated in a reversed process. Specifically, as shown in FIGS. 10(a) and 10(b), the combustion mode may be switched from HCCI to SI by cam profile switching. Referring to FIGS. 8(b), 8(c), 10(a) and 10(b), the cam profiles for valves 24, 26 and 27 may be respectively switched from lift curves 44, 45 and 48 to lift curves 43, 46 and 47. After switching however, the system status would be suitable only for SI operation at low-speed and medium-low loads, since only one intake valve (cold intake valve 24) essentially opens. As shown next in FIG. 10(c), hot-air throttle 36 may be closed for preparation of using hot intake valve 26 for the cold air. Lastly, as shown in FIG. 10(d), the cam profile for hot intake valve 26 may be switched again to open hot intake valve 26 to allow cold air to flow into cylinder 28. Specifically, referring to FIGS. 8(b), 8(c), 10(c) and 10(d), the cam profiles for hot intake valve 26 may be switched from lift curve 46 to lift curve 45.

For the second and third embodiments discussed herein, only one cold-air throttle is preferably used for a multi-cylinder engine. However, more than one hot-air throttle may be used for providing a smoother combustion mode transition since the cylinders can be controlled independently to switch the combustion mode of certain cylinders at certain time.

The fourth embodiment of the present invention, which provides for further improvement in promoting heterogeneity of the in-cylinder temperature distribution, will be discussed in detail below in reference to FIGS. 11-16.

As discussed above, in addition to promoting heterogeneity of the in-cylinder temperature distribution for the second and third embodiments, the fourth embodiment further promotes maintenance of a homogeneous air/fuel mixture so as to promote spontaneous HCCI combustion. For example, if the temperature in a cylinder is too high, radicals in the air/fuel mixture can autoignite too early, creating excessive peak pressures, poor efficiency and other issues (i.e. engine damage etc.). If the temperature is too low, radicals in the air/fuel mixture may not combust at all, creating a misfire condition unless a spark is present to salvage the combustion event. Moreover, the required temperature for autoignition varies with engine condition (i.e. speed, load, EGR, A/F ratio etc.).

Figure 11:
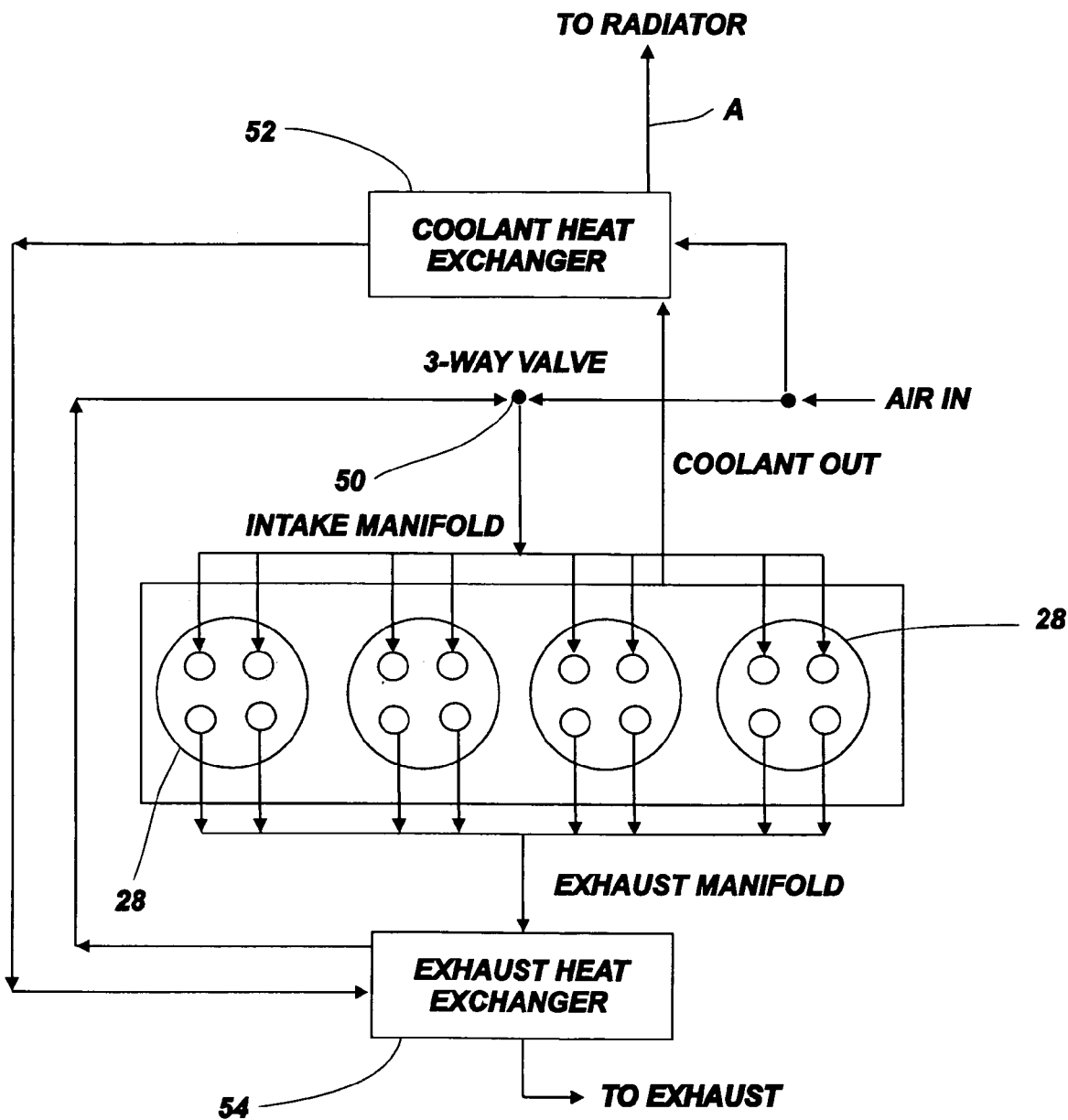
FIG. 11 is a schematic diagram of a related-art system for controlling the homogeneity of an air/fuel mixture by using a three-way valve to mix fresh intake air with preheated air from both a coolant/air and exhaust/air heat exchanger before introduction into the engine.

As shown in FIG. 11, in a related-art system shown, homogeneity of an air/fuel mixture is controlled by three-way valve 50 for mixing fresh intake air with preheated air from both a coolant/air 52 and exhaust/air heat exchanger 54 before introduction into the engine. The system of FIG. 11 allows temperature control within a desired range during steady-state operation (roughly 30-180° C.). However, three-way valve 50 has a relatively slow response time that prevents adequate control during rapidly changing engine operating conditions. The maximum temperature change rate is limited by the significant thermal mass (i.e. arrows A in FIG. 11) located downstream of three-way valve 50, which creates transient control issues. Moreover, intake manifold packaging requirements may create thermal differences between cylinders (i.e. distant cylinders may receive cooler charge than nearest ones), which tends to hinder the individual control of intake temperature for each cylinder.

Figure 12:
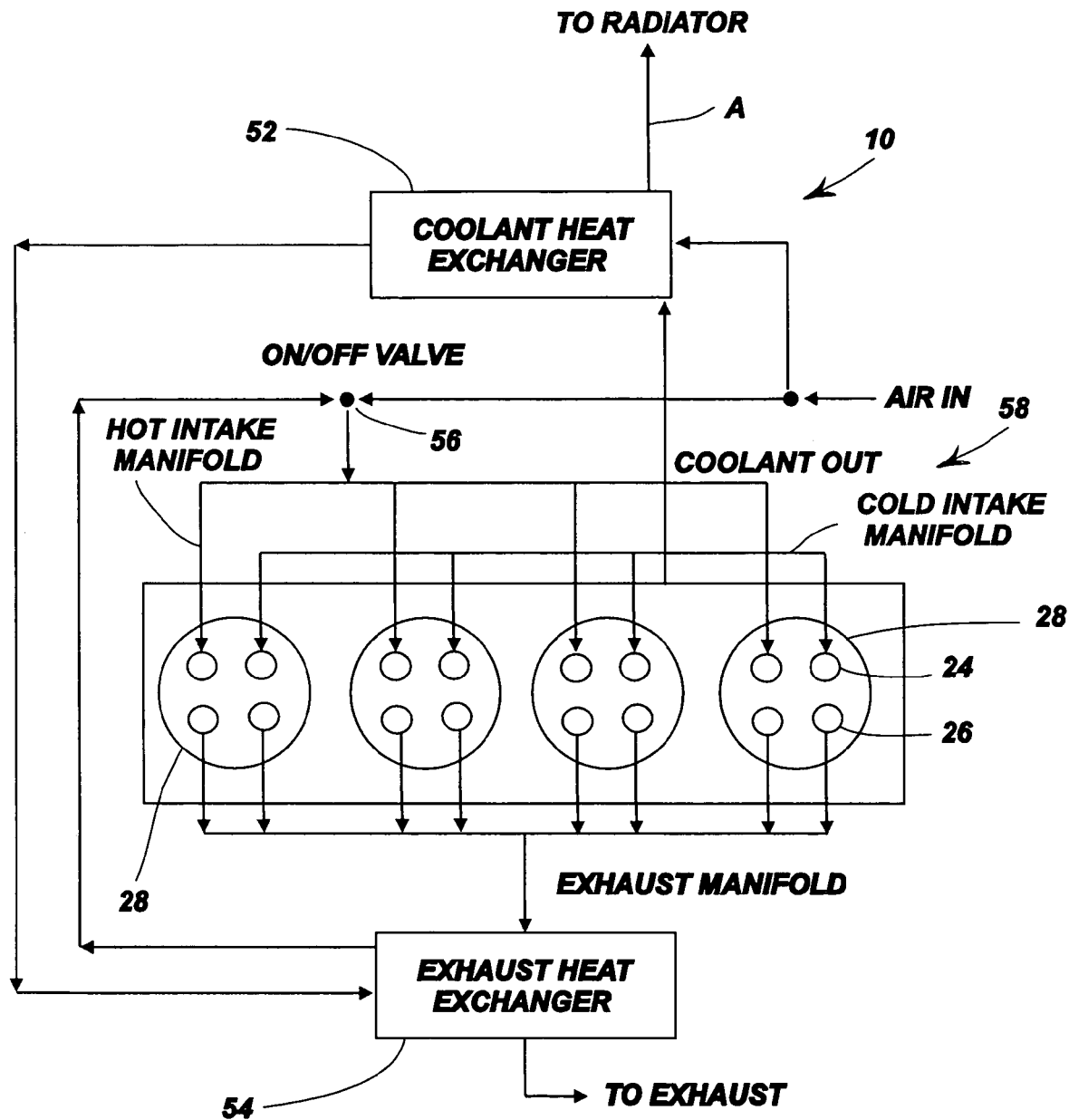
FIG. 12 is a schematic diagram of a system according to a fourth embodiment of the present invention for controlling the homogeneity of an air/fuel mixture.
Figure 13:
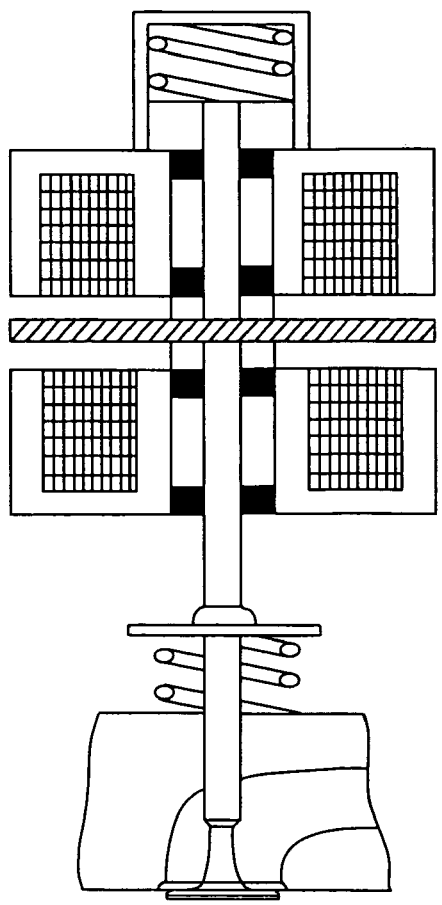
FIG. 13 is a schematic diagram of a linear oscillator for camless valve actuation according to the fourth embodiment of the present invention.
Figure 14:
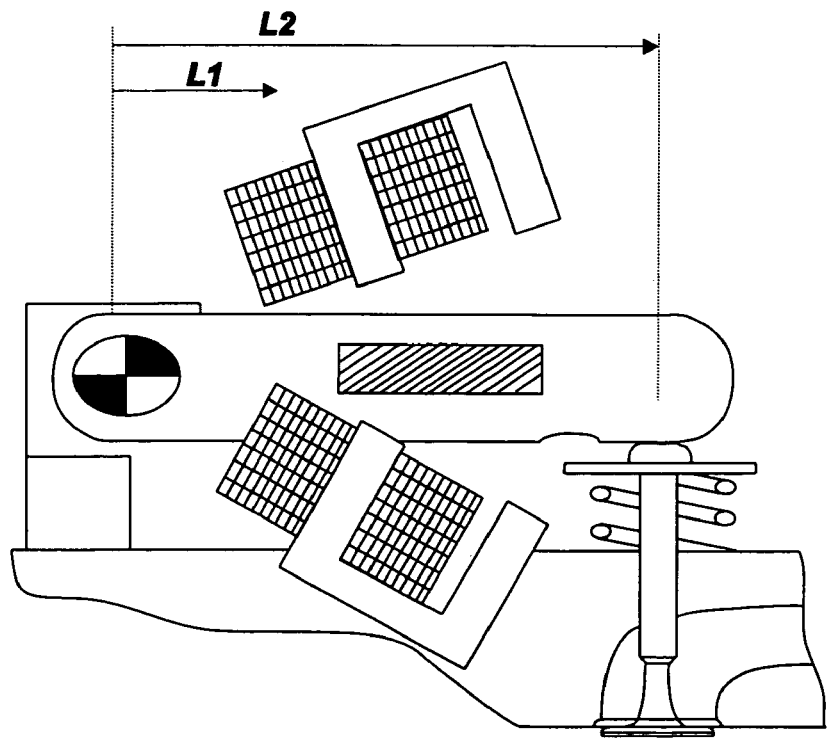
FIG. 14 is a schematic diagram of a lever oscillator for camless valve actuation according to the fourth embodiment of the present invention.

In order to overcome the aforementioned drawbacks of the related-art system of FIG. 11, as shown in FIG. 12, the fourth embodiment of the present invention combines camless technology with bifurcated intake manifold 58, and uses camless actuators to perform both intake flow and temperature control functions, thus eliminating the need for a three-way valve. Bifurcated intake manifold 58 includes one manifold 60 for supplying cool air (i.e. air at 30° C.) to cold intake valve 24 and a second manifold 62 for supplying hot air (i.e. air at 180° C.) to hot intake valve 26.

The aforementioned camless actuators and associated technology are disclosed in detail in U.S. patent application Ser. No. 10/248,665, which is co-owned by the Assignee herein and incorporated in its entirety by reference. In the embodiment of FIG. 12, camless valve actuators allow totally independent control of each valve by mounting a solenoid directly to the valve. The camless valve actuators utilized with the embodiment of FIG. 12 may be a linear oscillator or lever oscillator type of structure shown in FIGS. 13 and 14.

The fourth embodiment is advantageous over the aforementioned system for FIG. 11 in that camless actuators allow highly accurate cycle resolved intake temperature control (roughly 30-180° C.) during all engine operating conditions (steady state and transient). Intake/exhaust system 10 of FIG. 12 further allows for combustion monitoring devices (i.e., cylinder pressure, exhaust temp, spark ionization etc.) to be used to closely control the intake temperature in each cylinder 28 independently by appropriate feedback to the Camless strategy (i.e. optimize HCCI combustion in each cylinder), and allow for the elimination of undesired thermal mass effects for most operating conditions due to one intake valve having a cool ambient air supply at all times (i.e. on/off valve 56 allows full 4-valve operation for full-load operation with about ½ of previous design thermal mass). Intake/exhaust system 10 of FIG. 12 yet further allows for the effective control/feedback of trapped air charge temperature, which allows extension of the HCCI mode for a greater range of operating speeds and loads.

The method according to the fourth embodiment combines camless technology with a bifurcated intake manifold to realize the benefits of HCCI combustion, since camless technology provides flexibility in valve timing. Thus by selecting these timings appropriately, engine operation can be optimized for all conditions so as to minimize pumping work (i.e. late or early intake valve closing), manage internal EGR with overlap control (i.e. intake opening and exhaust closing), vary effective compression and expansion ratio (i.e. intake valve closing, exhaust valve opening), control swirl (i.e. only one intake valve opening), and maximize full load performance (i.e. optimal valve timings for volumetric efficiency).

The system of FIG. 12 simplifies the intake air heating device required for HCCI combustion by having the existing camless valve actuators perform the hot/cold air mixing process. Thus, instead of incorporating an upstream three-way mixing valve and associated plumbing along with its undesired thermal inertia as shown in FIG. 11, the system of FIG. 12 effectively integrates both air handling and air temperature functions into the existing camless valve actuator strategy. Moreover, continuous cycle resolved adjustments to the camless valve actuation strategy allows for precise combustion control.

Referring next to FIGS. 12, 15(*a*)-(*d*) and 16, camless valve operation according to the fourth embodiment is illustrated. For FIGS. 15(*a*)-(*d*), the designations Primary Intake Valve Opening (PIVO) and Primary Intake Valve Closing (PIVC) represent valve opening/closing for cold intake valve 24, and Secondary Intake Valve Opening (SIVO) and Secondary Intake Valve Closing (SIVC) represent valve opening/closing for hot intake valve 26. For the hot/cold intake opening/closing strategies illustrated in FIGS. 15(*a*)-(*d*), the bifurcated intake of FIG. 12 allows the trapped air charge temperature to be directly controlled by selection of the SIVC timing such that retarded SIVC timing increases trapped charge temperature and advanced SIVC timing reduces trapped charge temperature.

Referring to FIG. 15(*a*), for cold operation (i.e. SI operation), the valve timing may be provided such that only cold (i.e. primary) intake valve 24 opens as shown, and hot (i.e. secondary) intake valve 26 remains closed. Referring to FIGS. 15(*b*) and 15(*c*), for warm or warmer operation (i.e. transition from SI to HCCI), the valve timing may be provided such that cold (i.e. primary) and hot (i.e. secondary) intake valves 24, 26 open as shown. Lastly, referring to FIG. 15(*d*), for hot operation (i.e. HCCI operation), the valve timing may be provided such that only hot (i.e. secondary) intake valve 26 opens as shown, and cold (i.e. primary) intake valve 24 remains closed.

Those skilled in the art would appreciate in view of this disclosure that multiple other temperature control strategies are possible by varying the four valve timings (PIVO, PIVC, SIVC, SIVO). For example, retarding of SIVO has similar temperature effect as advancement of SIVC (i.e. early SIVO would maximize time for desired effective mixing). Alternatively, PIVO and SIVO may be selected to occur simultaneously, or either one first. Selections of aforementioned timings however must account for interactions on other important combustion effects (i.e. swirl ratio, pumping work, internal EGR, effective CR etc.)

Figure 16:
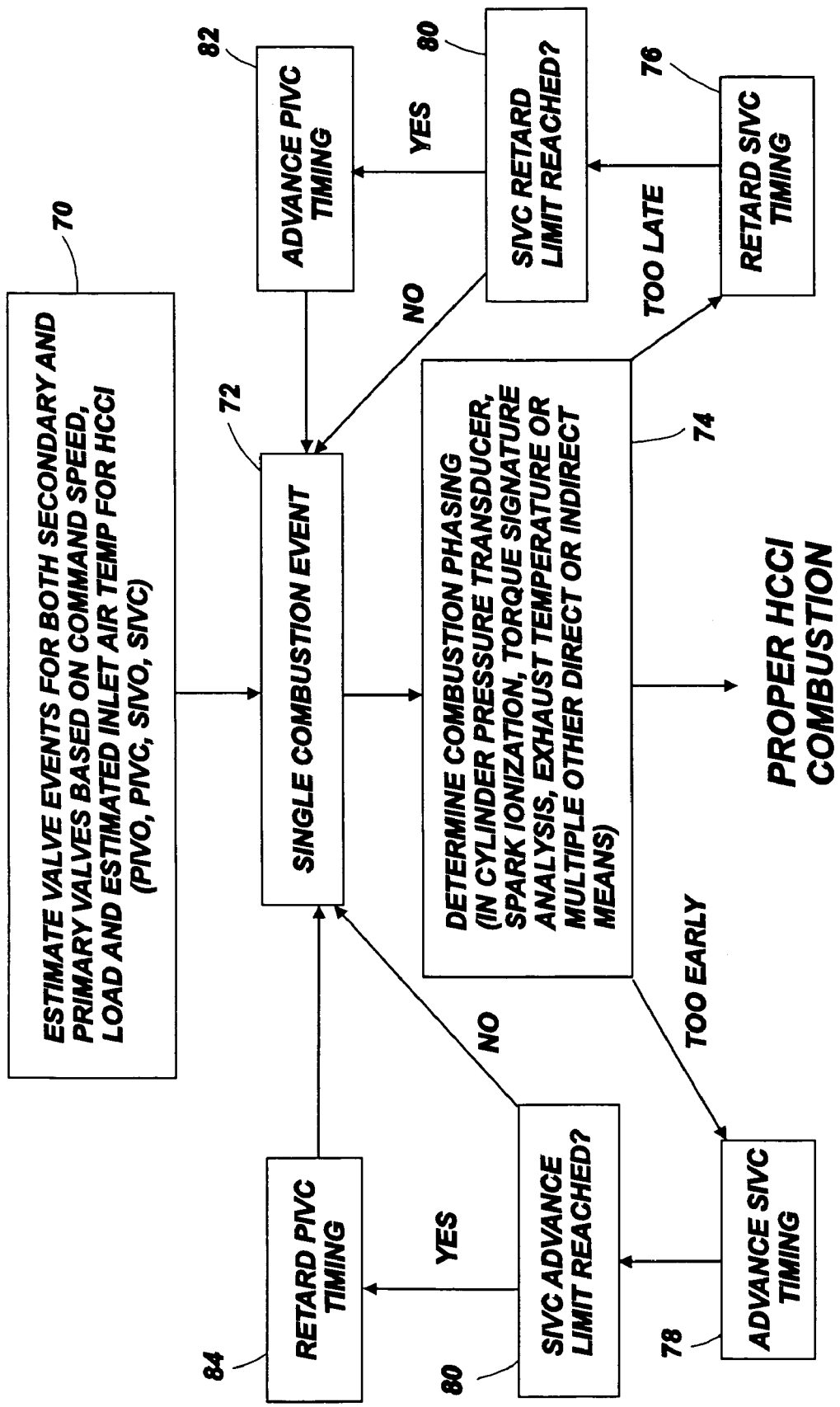
FIG. 16 is a combustion mode switching flowchart according to the fourth embodiment of the present invention.

Referring next to FIG. 16, there is provided a combustion mode switching flowchart according to the fourth embodiment of the present invention. As illustrated in the flowchart, in order to obtain proper HCCI combustion for a given set of conditions, at step-70, the valve events for both secondary (i.e. hot intake valve 26) and primary (i.e. cold intake valve 24) valves based on commanded speed, load and estimated inlet air temp for HCCI may be estimated. Thereafter, at step-72, if the event is a single combustion event, the combustion phasing may be determined at step-74. If the combustion phasing is too late, SIVC timing may be retarded at step-76, or alternatively, advanced at step-78 if combustion phasing is too early. Upon reaching the limit of SIVC retard timing (i.e. step 80), PIVC timing may be advanced at step 82 or alternatively retarded at step 84, as needed. If the aforementioned combustion phasing is not too late or too early, optimal HCCI combustion may be attained according to the flowchart.

The concepts and principles of the first through fourth embodiments of intake/exhaust system 10 may be applied in both in-line engines and V-arrangement engines. Moreover, it should be noted that the cylinder and valve arrangements of FIGS. 1-12 are only shown for illustrative purposes, and are not intended to limit the application of the present invention to a specific engine type or arrangement.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

GLOSSARY OF TERMS

10 . . . intake/exhaust system
12 . . . exhaust valve lift curve
13 . . . exhaust valve lift curve
14 . . . intake valve lift curve
15 . . . intake valve lift curve 20 . . . cold intake valve lift curve
22 . . . hot intake valve lift curve
23 . . . cam profile switching device
24 . . . cold intake valve
25 . . . cam profile switching device
26 . . . hot intake valve
27 . . . exhaust valves
28 . . . cylinder
29 . . . lift curve
30 . . . lift curve
31 . . . lift curve
32 . . . lift curve
33 . . . lift curve
34 . . . cold-air throttle
35 . . . cam profile switching device
36 . . . hot-air throttle
37 . . . cam profile switching device
38 . . . check valve
39 . . . cam profile switching device
40 . . . hot intake duct
42 . . . cold intake duct
43 . . . lift curve
44 . . . lift curve
45 . . . lift curve
46 . . . lift curve
47 . . . lift curve
48 . . . lift curve
50 . . . three-way valve
52 . . . coolant/air heat exchanger
54 . . . exhaust/air heat exchanger
56 . . . on/off valve
58 . . . bifurcated intake manifold
60 . . . one manifold
62 . . . second manifold

What is claimed is:

1. An intake/exhaust system for a dual-mode homogeneous charge compression ignition (HCCI) engine operable in SI and HCCI modes, said system comprising:
at least one cylinder including at least one intake valve and at least one exhaust valve;
at least one cam profile switching device operatively connected to at least one of said intake and exhaust valves;
at least one cold-air duct connected to said cylinder for supplying cold air to said cylinder upon opening of said intake valve and a cold-air throttle;
at least one hot-air duct connected to said cylinder for supplying heated air to said cylinder upon opening of said intake valve and hot-air throttle; and
at least one check valve connected between said cold and hot-air ducts for permitting flow of air between said ducts.

2. They system according to claim 1, wherein said cam profile switching device is a roller-roller two-step finger follower.

3. The system according to claim 1, further comprising a first cam profile switching device operatively connected to a cold intake valve, and a second cam profile switching device operatively connected to at least two exhaust valves.

4. The system according to claim 3, wherein said first cam profile switching device switches an event length of said cold intake valve from approximately 280-320 cad to approximately 150-210 cad, and said second cam profile switching device switches an event length of said exhaust valves from approximately 230-250 cad to approximately 190-220 cad, for combustion mode transition from SI to FICCI mode, and vice-versa for combustion mode transition from HCCI to SI mode.

5. They system according to claim 3, wherein said first cam profile switching device switches a normalized valve maximum lift to said cold intake valve from approximately 1 to approximately 0.3-0.7, and said second cam profile switching device switches a normalized valve maximum lift to said exhaust valves from approximately 1 to approximately 0.8-0.95, for combustion mode transition from SI to FICCI mode, and vice-versa for combustion mode transition from FICCI to SI mode.

6. The system according to claim 3, wherein said first cam profile switching device switches a valve opening time of said cold intake valve from approximately 0-15 cad to approximately −50-0 cad at top dead center, and said second cam profile switching device switches a valve opening time of said exhaust valves from approximately 50-70 cad to approximately 40-60 cad at bottom dead center, for combustion mode transition from SI to HCCI mode, and vice-versa for combustion mode transition from HCCI to SI mode.

7. The system according to claim 3, wherein said first cam profile switching device switches a valve closing time of said cold intake valve from approximately 95-125 cad to approximately 25-45 cad at bottom dead center, and said second cam profile switching device switches a valve closing time of said exhaust valves from approximately 0-20 cad to approximately −35-0 cad at top dead center, for combustion mode transition from SI to HCCI mode, and vice-versa for combustion mode transition from HICCI to SI mode.

8. The system according to claim 1, further comprising first, second and third cam profile switching devices operatively connected to a cold intake valve, a hot intake valve and at least two exhaust valves, respectively.

9. The system according to claim 8, wherein said second cam profile switching device switches an event length of said hot intake valve from approximately 170-210 cad to approximately less than 180 cad to begin combustion mode transition from SI to HCCI mode, and vice-versa to begin combustion mode transition from HCCI to SI mode.

10. They system according to claim 8, wherein said first cam profile switching device switches an event length of said cold intake valve from approximately 280-320 cad to approximately 150-210 cad, said second cam profile switching device switches an event length of said hot intake valve from approximately less than 180 cad to approximately 170-210 cad, and said third cam profile switching device switches an event length of said exhaust valves from approximately 230-250 cad to approximately 190-220 cad, for combustion mode transition from SI to HCCI mode, and vice-versa for combustion mode transition from HCCI to SI mode.

11. The system according to claim 8, wherein said second cam profile switching device switches a normalized valve maximum lift to said hot intake valve from approximately 0.8-0.95 to approximately less than 0.2 to begin combustion mode transition from SI to HCCI mode, and vice-versa to begin combustion mode transition from HCCL to SI mode.

12. The system according to claim 8, wherein said first cam profile switching device switches a normalized valve maximum lift of said cold intake valve from approximately 1 to approximately 0.3-0.1, said second cam profile switching device switches a normalized valve maximum lift of said hot intake valve from approximately less than 0.2 to approximately 0.8-0.95, and said third cam profile switching device switches a normalized valve maximum lift of said exhaust valves from approximately 1 to approximately 0.8-0.95, for combustion mode transition from SI to HCCI mode, and vice-versa for combustion mode transition from HCCI to SI mode.

13. They system according to claim 8, wherein said second cam profile switching device switches a valve opening time of said hot intake valve from approximately −35-0 cad to approximately −60-25 cad at top dead center to begin combustion mode transition from SI to HCCI mode, and vice-versa to begin combustion mode transition from HCCI to SI mode.

14. They system according to claim 8, wherein said first cam profile switching device switches a valve opening time of said cold intake valve from approximately 0-15 cad to approximately −50-0 cad at top dead center, said second cam profile switching device switches a valve opening time of said hot intake valve from approximately −60-25 cad to approximately −35-0 cad at top dead center, and said third cam profile switching device switches a valve opening time of said exhaust valves from approximately 50-70 cad to approximately 40-60 cad at bottom dead center, for combustion mode transition from SI to HCCI mode, and vice-versa fro combustion mode transition from HCCI to SI mode.

15. The system according to claim 8, wherein said second cam profile switching device switches a valve closing time of said hot intake valve from approximately 25-45 cad to approximately 0-25 cad at bottom dead center to begin combustion mode transition from SI to HCCI mode, and vice-versa to begin combustion mode transition from HCCI to SI mode.

16. The system according to claim 8, wherein said first cam profile switching device switches a valve closing time of said cold intake valve from approximately 95-125 cad to approximately 25-45 cad at bottom dead center, said second cam profile switching device switches a valve closing time of said hot intake valve from approximately 0-25 cad to approximately 25-45 cad at bottom dead center, and said third cam profile switching device switches a valve closing time of said exhaust valves from approximately 0-20 cad to approximately −35-0 cad at top dead center, for combustion mode transition from SI to HCCI mode, and vice-versa for combustion mode transition from HCCI to SI mode.

17. A method of combustion mode transition in a dual-mode homogeneous charge compression ignition (HCCI) operable in SI and HCCI modes, said method comprising the steps of: providing an intake/exhaust system including:
- at least one cylinder including at least one intake valve and at least one exhaust valve;
- at least one cam profile switching device operatively connected to at least one of said intake and exhaust valves;
- at least one cold-air duct connected to said cylinder for supplying cold air to said cylinder upon opening of said intake valve and a cold-air throttle;
- at least one hot-air duct connected to said cylinder for supplying heated air to said cylinder upon opening of said intake valve and a hot-air throttle; and
- at least one check valve connected between said cold and hot-air ducts for permitting flow of air between said ducts; and
- operating said cold-air and hot-air throttles, and said check valve to control temperature and flow of air supplied to said cylinder.

* * * * *

UNITED STATES PATENT AND TRADEMARK OFFICE
CERTIFICATE OF CORRECTION

PATENT NO.      : 7,258,104 B2
APPLICATION NO. : 11/372715
DATED           : August 21, 2007
INVENTOR(S)     : Jialin Young et al.

It is certified that error appears in the above-identified patent and that said Letters Patent is hereby corrected as shown below:

On the title of the patent, item (74) should read as follows: -- (74) Attorney, Agent, or Firm–Diana Brehob; Dickinson Wright PLLC --

In The Claims:

Claim 2, Column 15, Line 55, should read as follows: -- The system according to claim 1, wherein said cam --

Claim 4, Column 16, Line 2, should read as follows: -- HCCI mode, and vice-versa for combustion mode transition --

Claim 5, Column 16, Line 4, should read as follows: -- The system according to claim 3, wherein said first --

Claim 5, Column 16, Line 11, should read as follows: -- HCCI mode, and vice-versa for combustion mode transition --

Claim 5, Column 16, Line 12, should read as follows: -- from HCCI to SI mode. --

Claim 7, Column 16, Line 31, should read as follows: -- for combustion mode transition from HCCI to SI mode. --

Claim 10, Column 16, Line 42, should read as follows: -- The system according to claim 8, wherein said first --

Claim 11, Column 16, Line 59, should read as follows: -- begin combustion mode transition from HCCI to SI mode. --

Claim 12, Column 16, Line 63, should read as follows: -- 1 to approximately 0.3-0.7, said second cam profile switch- --

Claim 13, Column 17, Line 5, should read as follows: -- The system according to claim 8, wherein said --

UNITED STATES PATENT AND TRADEMARK OFFICE
CERTIFICATE OF CORRECTION

PATENT NO.         : 7,258,104 B2
APPLICATION NO. : 11/372715
DATED              : August 21, 2007
INVENTOR(S)        : Jialin Young et al.

It is certified that error appears in the above-identified patent and that said Letters Patent is hereby corrected as shown below:

Claim 14, Column 17, Line 12, should read as follows: -- The system according to claim 8, wherein said first --

Claim 14, Column 17, Line 23, should read as follows: -- versa for combustion mode transition from HCCI to SI --

Signed and Sealed this

Fifteenth Day of April, 2008

JON W. DUDAS
*Director of the United States Patent and Trademark Office*